(12) United States Patent
Buffington et al.

(10) Patent No.: US 11,767,616 B2
(45) Date of Patent: *Sep. 26, 2023

(54) ACRYLIC COMPOSITIONS INCLUDING A HINDERED AMINE LIGHT STABILIZER AND METHODS OF MAKING AND USING THE SAME

(71) Applicant: Glen Raven, Inc., Glen Raven, NC (US)

(72) Inventors: David Buffington, Elon, NC (US); Gary Kevin Hyde, Allen, TX (US)

(73) Assignee: Glen Raven, Inc., Burlington, NC (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/638,832

(22) PCT Filed: Aug. 17, 2018

(86) PCT No.: PCT/IB2018/056222
§ 371 (c)(1),
(2) Date: Feb. 13, 2020

(87) PCT Pub. No.: WO2019/035072
PCT Pub. Date: Feb. 21, 2019

(65) Prior Publication Data
US 2020/0255982 A1  Aug. 13, 2020

Related U.S. Application Data

(63) Continuation-in-part of application No. 15/725,537, filed on Oct. 5, 2017, now Pat. No. 10,214,836.
(Continued)

(51) Int. Cl.
*D01F 6/36* (2006.01)
*D01F 1/04* (2006.01)
(Continued)

(52) U.S. Cl.
CPC ............... *D01F 6/36* (2013.01); *C08L 33/20* (2013.01); *D01F 1/04* (2013.01); *D01F 1/106* (2013.01);
(Continued)

(58) Field of Classification Search
None
See application file for complete search history.

(56) References Cited

U.S. PATENT DOCUMENTS 3,431,244 A * 3/1969 Brealey ............... C08F 2/04
528/373
3,663,161 A 5/1972 Litzler et al.
(Continued)

FOREIGN PATENT DOCUMENTS

CN    1437630 A    8/2003
CN  104629249      5/2015
(Continued)

OTHER PUBLICATIONS

Machine translation of JP2003113245 (Year: 2003).*
(Continued)

*Primary Examiner* — Shawn Mckinnon
(74) *Attorney, Agent, or Firm* — Myers Bigel, P.A.

(57) ABSTRACT

Acrylic compositions comprising a hindered amine light stabilizer are described herein. The acrylic composition may be in the form of a fiber, thread, yarn, and/or fabric. Also described herein are methods of making and using the acrylic compositions and articles comprising an acrylic composition as described herein.

20 Claims, 14 Drawing Sheets poly(acrylonitrile-co-vinyl acetate)

poly(acrylonitrile-co-methyl methacrylate)

poly(acrylonitrile-co-methyl acrylate)

poly(acrylonitrile-co-vinylidene chloride)

poly(acrylonitrile-co-vinyl chloride)

polyacrylonitrile

Related U.S. Application Data

(60) Provisional application No. 62/547,497, filed on Aug. 18, 2017.

(51) Int. Cl.

| | |
|---|---|
| *D01F 1/10* | (2006.01) |
| *D02G 3/04* | (2006.01) |
| *C08L 33/20* | (2006.01) |
| *C08K 5/3435* | (2006.01) |
| *C08K 5/357* | (2006.01) |
| *D01F 6/10* | (2006.01) |
| *D01F 6/16* | (2006.01) |
| *C08K 5/3492* | (2006.01) |

(52) U.S. Cl.
CPC ........... *D02G 3/045* (2013.01); *C08K 5/3435* (2013.01); *C08K 5/3492* (2013.01); *C08K 5/357* (2013.01); *D01F 6/10* (2013.01); *D01F 6/16* (2013.01)

(56) References Cited

U.S. PATENT DOCUMENTS

| | | | |
|---|---|---|---|
| 3,746,672 | A | 7/1973 | Thompson |
| 4,004,053 | A | 1/1977 | Gump et al. |
| 4,094,498 | A * | 6/1978 | Blickenstaff ........... B65H 41/00 270/52.11 |
| 4,094,948 | A | 6/1978 | Blickenstaff |
| 4,525,504 | A | 6/1985 | Morris et al. |
| 6,630,527 | B2 | 10/2003 | Pierre et al. |
| 7,582,690 | B2 | 9/2009 | Pearson et al. |
| 7,998,886 | B2 | 8/2011 | Li et al. |
| 9,156,966 | B2 | 10/2015 | Sakellarides |
| 2003/0069337 | A1 | 4/2003 | Gugumus |
| 2003/0199618 | A1* | 10/2003 | Gugumus ............ C08K 5/5419 524/102 |
| 2006/0025504 | A1* | 2/2006 | Oriani ................. C08L 23/0815 524/236 |
| 2011/0306257 | A1 | 12/2011 | Arpin |
| 2012/0007283 | A1 | 1/2012 | Minkwitz |
| 2015/0299426 | A1 | 10/2015 | Mulholland |

FOREIGN PATENT DOCUMENTS

| | | |
|---|---|---|
| EP | 0704560 | 4/1996 |
| EP | 1585790 | 3/2008 |
| EP | 2216364 A1 | 8/2010 |
| EP | 1644573 | 6/2012 |
| EP | 2630137 * | 8/2013 |
| GB | 1349669 A | 4/1974 |
| JP | H0770816 * | 3/1995 |
| JP | H0770816 B2 | 7/1995 |
| JP | 2003003321 A | 1/2003 |
| JP | 2003113245 | 4/2003 |
| WO | 0192392 A2 | 12/2001 |
| WO | 2013148295 | 10/2013 |

OTHER PUBLICATIONS

Machine translation of JPH0770816 (Year: 1995).*
Addivant "Polyesters and Polycarbonates: High performance antioxidants for polyesters (PET, PBT, UPE, PLA) & polycarbonates" https://www.addivant.com/polyesters-polycarbonates (3 pages) (2018).
BASF The Chemical Company "Tinuvin® 111: Synergistic mixture of monomeric and oligomeric hindered amine stabilizers" Technical Information (2 pages) (2010).
BASF The Chemical Company "Tinuvin® PA 123: Liquid low molecular weight hindered amine NOR stabilizer" Technical Information (2 pages) (2010).
BASF The Chemical Company "Tinuvin® 622: Oligomeric hindered amine light stabilizer (HALS)" Technical Information (2 pages) (2011).
BASF The Chemical Company "Tinuvin® 5100: hindered amine light stabilizer (HALS)" Technical Information (2 pages) (2011).
BASF The Chemical Company & MULLER, Daniel "Performance Chemicals / Plastic Additives: Stabilization of PET fibers" Competence Center Films & Tapes (14 pages) (2014).
Capocci, Gerald "Raising the Roof: The Next Generation PVC" https://www.pharosproject.net/uploads/files/sources/1828/hubbard-hals.pdf (5 pages) (2004).
Feldman, D. "Polymer Weathering: Photo-Oxidation" Journal of Polymers and the Environment, 10(4):163-173 (2002).
Frushour et al. Acrylic Fibers. In Menachem Lewin & Eli M. Pearce (Eds.), Handbook of Fiber Chemistry (pp. 992-995), New York, NY: Marcel Dekker, Inc. (1998).
Gerlock et al. "Photo-Stabilisation and Photo-Degradation in Organic Coatings Containing A Hindered Amine Light Stabiliser. Part I—ESR Measurements of Nitroxide Concentration" Polymer Degradation and Stability, 14:53-71 (1986).
Gerlock et al. "Photo-Stabilisation and Photo-Degradation in Organic Coatings Containing A Hindered Amine Light Stabiliser. Part II—Consumption of Hindered Amine" Polymer Degradation and Stability, 14:73-84 (1986).
International Search Report and the Written Opinion of the International Searching Authority corresponding to International Patent Application No. PCT/IB2018/056222 (12 pages) (dated Dec. 17, 2018).
King et al. "UV Stabilization: Overview of Chemistry vs. Effect" Presentation—Society of Plastics Engineers ANTEC 2014 (43 pages) (2014).
Plastics Technology "No. 31—Hals UV Stabilizers" https://www.ptonline.com/articles/no-31-hals-uv-stabilizers (2 pages) (2005).
Scheirs, John "A Guide to Polymeric Geomembranes" pp. 44-49 Edithvale:Wiley (2009).
Wentworth, Gary "Thermal and Actinic Degradation" Acrylic Fiber Technology and Applications, Chapter 8, Part III, pp. 268-283, edited by James C. Masson (1995).
Yousif et al. "Photostabilization of poly(vinyl chloride)—Still on the run" Journal of Taibah University for Science, 9:421-448 (2015).
Zuo, Feng "Stabilization of Polymers" Presentation—2014 Glen Raven World Cup (60 pages) (2014).
Locock et al. "Oligomeric Cationic Polymethacrylates: A Comparison of Methods for Determining Molecular Weight" Analytical Chemistry, 86:2131-2137 (2014).
Gijsman, Pieter "Photostabilisation of Polymer Materials" Photochemistry and Photophysics of Polymer Materials, chapter 17, pp. 627-679 (2010).
Federal Trade Commission 16 CFR Ch. 1 (Jan. 1, 2022 Edition)) § 303.7 "Generic names and definitions for manufactured fibers" pp. 231-233 (2022).

* cited by examiner

ACRYLIC COMPOSITIONS INCLUDING A HINDERED AMINE LIGHT STABILIZER AND METHODS OF MAKING AND USING THE SAME

RELATED APPLICATION INFORMATION

This application claims the benefit of U.S. Provisional Patent Application Ser. No. 62/547,497, filed Aug. 18, 2017, and to U.S. patent application Ser. No. 15/725,537, filed Oct. 5, 2017, the disclosure of each of which is incorporated herein by reference in its entirety.

FIELD

The present invention relates to acrylic compositions comprising a hindered amine light stabilizer (HALS) along with methods of making and using the same.

BACKGROUND

Acrylic fibers are ideally suited for use in many outdoor textile applications. Fabrics made from acrylic fibers are highly UV-resistant and can be solution-dyed to provide excellent color stability. These properties create textile goods optimized for many applications in outdoor environments such as shade structures, awnings, marine covers and outdoor furniture.

In contrast to other fibers and fabrics made from materials such as polypropylene, polyethylene, polyester, nylon and polyvinylchloride, fibers and fabrics made from acrylics are known to be the most weatherable even though formulated without UV light stabilizers.

SUMMARY

A first aspect of the present invention is directed to an acrylic composition comprising: an acrylonitrile polymer having acrylonitrile units present in an amount of at least 85% by weight of the acrylonitrile polymer; and a hindered amine light stabilizer. In some embodiments, the acrylonitrile polymer is a polyacrylonitrile homopolymer.

Another aspect of the present invention is directed to a method of preparing an acrylic fiber, the method comprising: adding a hindered amine light stabilizer to an acrylonitrile polymer to provide a stabilized acrylic composition; and forming an acrylic fiber from the stabilized acrylic composition, thereby preparing the acrylic fiber. In some embodiments, forming the acrylic fiber comprises spinning and/or extruding the stabilized acrylic composition to prepare the acrylic fiber.

A further aspect of the present invention is directed to an article comprising an acrylic composition of the present invention and/or an acrylic fiber prepared according to a method of the present invention. In some embodiments, the article is a fabric (e.g., an outdoor fabric and/or an automotive interior fabric), shade structure, awning, marine cover, sail (e.g., boat sail), furniture item (e.g., chair, couch, outdoor furniture item, etc.), boat, car, etc.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EXAMPLE EMBODIMENTS

Figure 1:
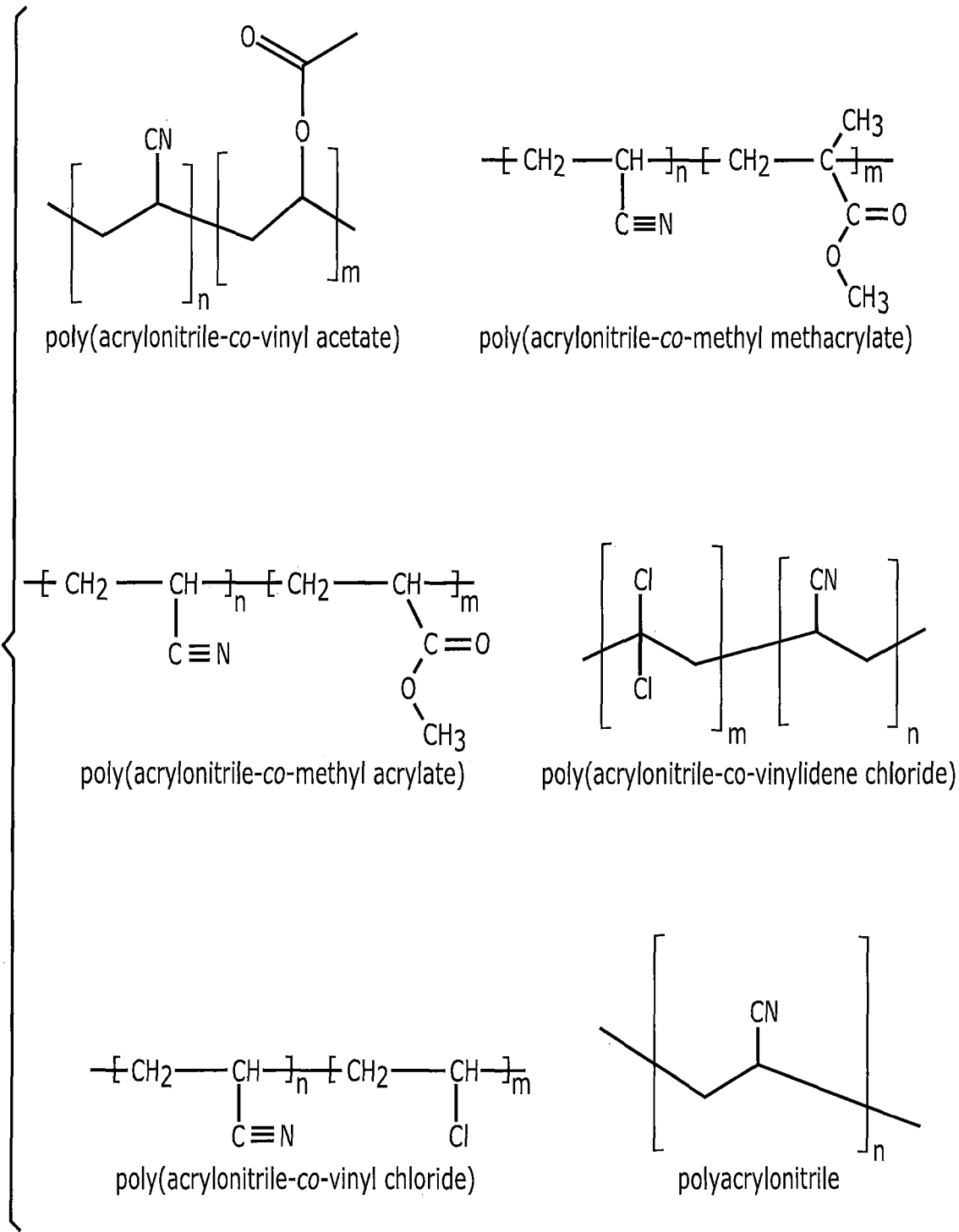
FIG. 1 shows chemical structures of acrylonitrile polymers that may be present in an acrylic composition and/or used to prepare an acrylic composition according to example embodiments of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, In re Herz, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

The term "about," as used herein when referring to a measurable value such as an amount or concentration and the like, is meant to encompass variations of ±10%, ±5%, +1%, +0.5%, or even ±0.1% of the specified value as well as the specified value. For example, "about X" where X is the measurable value, is meant to include X as well as variations of ±10%, ±5%, ±1%, ±0.5%, or even ±0.1% of X. A range provided herein for a measureable value may include any other range and/or individual value therein.

As used herein, the terms "increase," "increases," "increased," "increasing," and similar terms indicate an elevation in the specified parameter or value of at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500% or more.

As used herein, the terms "reduce," "reduces," "reduced," "reduction," "inhibit," and similar terms refer to a decrease in the specified parameter or value of at least about 5%, 10%, 15%, 20%, 25%, 30%, 35%, 40%, 45%, 50%, 55%, 60%, 65%, 70%, 75%, 80%, 85%, 90%, 95%, 97%, or 100%.

Provided according to embodiments of the present invention are acrylic compositions. An acrylic composition of the present invention comprises an acrylonitrile polymer and a hindered amine light stabilizer. As used herein "acrylonitrile polymer" refers to a polymer having acrylonitrile units present in an amount of at least 85% by weight of the acrylonitrile polymer. In some embodiments, an acrylonitrile polymer includes about 85%, 86%, 87%, 88%, 89%, 90%, 91%, 92%, 93%, 94%, 95%, 96%, 97%, 98%, 99%, or 100% acrylonitrile units by weight of the acrylonitrile polymer. In some embodiments, an acrylonitrile polymer comprises acrylonitrile units in an amount of at least 85% to about 100% by weight of the acrylonitrile polymer. An acrylonitrile polymer of the present invention does not include polymethyl methacrylate (PMMA). In some embodiments, an acrylic composition of the present invention does not include PMMA.

An acrylic composition of the present invention comprises or is a manufactured fiber in which the fiber-forming substance includes or is an acrylonitrile polymer as defined herein. In some embodiments, the acrylonitrile polymer is the primary fiber-forming substance. Thus, the acrylic composition of the present invention may also be referred to as a polyacrylonitrile composition. An acrylic fiber of the present invention is a manufactured fiber in which the fiber-forming substance includes or is an acrylonitrile polymer as defined herein and is the extrudate (e.g., solidified, dried, and/or cooled extrudate) from a fiber spinning process (e.g., a wet or dry spinning process). An acrylic fiber of the present invention may be in any suitable form, such as, for example, staple, tow, filament, or monofilament. Typically, an acrylic staple fiber has a length in a range from about 0.75 inches to about 18 inches, and an acrylic filament fiber has any suitable length (e.g., greater than 18 inches to about 2, 4, 6, 8, 10, 100, 200, 1,000, 10,000, or 20,000, 30,000 yards or infinite length). In some embodiments, an acrylic fiber of the present invention is not in the form of a core sheath fiber (e.g., a fiber having a material in a different concentration in the core than in the sheath) and/or a bi-component fiber.

An acrylic yarn of the present invention comprises a plurality of acrylic fibers arranged in any suitable manner. In some embodiments, an acrylic yarn may be a plurality of acrylic fibers arranged so that at least a portion (e.g., a majority) of the acrylic fibers of the plurality are parallel to each other and the plurality of acrylic fibers may be twisted. An acrylic yarn of the present invention may be in any suitable form, such as, for example, a filament yarn (i.e., a yarn made using one or more continuous acrylic fiber(s)) or a staple yarn (i.e., a yarn made using two or more staple acrylic fibers). A filament yarn is composed of a continuous filament that may be assembled with or without twist. Filament yarns composed of a single filament are called monofilaments and those of two or more filaments are called multifilaments. A spun or stable yarn is composed of staple fibers that are held together by a binding mechanism. In some embodiments, an acrylic yarn of the present invention comprises about 80%, 85%, 90%, 95%, 98%, or 100% acrylic fibers of the present invention based on the weight of the acrylic yarn or the total number of fibers in the yarn. In some embodiments, one or more properties (e.g., tensile strength, break strength, and/or flexibility) of a yarn (e.g., an acrylic yarn of the present invention) may be measured with a yarn having a 18/2 Ring Spun Cotton Count with 12.25 turns per inch in the singles yarn and 12.4 turns per inch in the ply, with the yarn optionally being prepared with 2 denier fibers having a 45 mm staple length.

An acrylic fabric of the present invention comprises a plurality of acrylic fibers and optionally a plurality of acrylic yarns. A nonwoven acrylic fabric of the present invention comprises a plurality of acrylic fibers that are bonded together, such as, e.g., through physical entanglement of the acrylic fibers, adhesive bonding of the acrylic fibers, melt bonding of the acrylic fibers, solvent bonding of the acrylic fibers, and any combination thereof. A woven acrylic fabric of the present invention comprises a plurality of acrylic yarns that are interlaced and/or intermeshed. In some embodiments, an acrylic fabric may be woven in the form of a plain weave, twill weave, leno weave, dobby weave, jacquard weave, and/or satin weave. In some embodiments, an acrylic fabric may be woven in the form of a plain weave. In some embodiments, an acrylic fabric of the present invention comprises about 80%, 85%, 90%, 95%, 98%, or 100% acrylic fibers and/or yarns of the present invention based on the weight of the fabric or the total number of fibers and/or yarns in the fabric. In some embodiments, one or more properties (e.g., CIE Delta E and/or Gray Scale value) of a fabric (e.g., an acrylic fabric of the present invention) may be measured with a plain weave 75 epi×35 ppi fabric and/or a plain weave 68 epi×30 ppi fabric, with the fabric optionally being prepared with a yarn having a 18/2 Ring Spun Cotton Count with 12.25 turns per inch in the singles yarn and 12.4 turns per inch in the ply, with the yarn optionally being prepared with 2 denier fibers having a 45 mm staple length.

Example acrylonitrile polymers include, but are not limited to, polyacrylonitrile (PAN), poly(acrylonitrile-co-vinyl acetate) (P(AN-VA)), poly(acrylonitrile-co-methyl acrylate) (P(AN-MA)), poly(acrylonitrile-co-vinyl chloride) (PAN-VC), poly(acrylonitrile-co-vinylidene chloride, and/or poly(acrylonitrile-co-methyl methacrylate). Some example acrylonitrile polymer structures are shown in FIG. 1, where m may be 0 to 0.15 and n may be 0.85-1. In some embodiments, the acrylonitrile polymer is a polyacrylonitrile homopolymer (i.e., PAN). In some embodiments, the acrylonitrile polymer is a polyacrylonitrile copolymer (e.g., P(AN-VA), P(AN-MA), PAN-VC, etc.). In some embodiments, the acrylonitrile polymer is selected from poly(acrylonitrile-co-vinyl acetate), poly(acrylonitrile-co-methyl acrylate), and/or poly(acrylonitrile-co-methyl methacrylate). In some embodiments, the acrylonitrile polymer is poly(acrylonitrile-co-vinyl acetate).

In some embodiments, the acrylonitrile polymer comprises one or more (e.g., 1, 2, 3, 4, 5, or more) comonomer unit(s) (e.g., a neutral and/or acid comonomer unit). A comonomer may be present in an acrylonitrile polymer in an amount of about 0.1%, 0.5%, 1%, 2%, 3%, 4%, 5%, 6%, 7%, 8%, 9%, 10%, 11%, 12%, 13%, 14%, or 15% by weight of the acrylonitrile polymer. In some embodiments, an acrylonitrile polymer comprises comonomer units in an amount of about 0.1% to about 15% by weight of the acrylonitrile polymer. Example comonomer units include, but are not limited to, vinyl acetate, vinyl chloride, vinylidene chloride, styrene, methyl methacrylate, vinyl acetate, methyl acrylate, sodium styrene sulfonate, sodium methallyl sulfonate, sodium sulfophenyl methallyl, ether, and/or itaconic acid. As those skilled in the art will understand, an acrylonitrile polymer may be obtained by polymerizing an acrylonitrile monomer, optionally in the presence of one or more comonomers. In some embodiments, an acrylonitrile polymer that may be present in and/or used to prepare an acrylic composition of the present invention may comprise acrylonitrile units in an amount of about 90% to about 94% by weight of the acrylonitrile polymer and comonomer units in an amount of about 6% to about 10% by weight of the acrylonitrile polymer. The comonomer units may comprise neutral comonomer units in an amount of about 6% to about 9% by weight of the acrylonitrile polymer and acid comonomer units in an amount of about 0% to about 1% by weight of the acrylonitrile polymer. In some embodiments, an acrylonitrile polymer that may be present in and/or used to prepare an acrylic composition of the present invention may have a composition as provided in Table 1.

TABLE 1

Composition of example acrylonitrile polymers.

| Acrylonitrile | Neutral Comonomer | Acid Comonomer |
|---|---|---|
| 90-94% acrylonitrile | 6-9% of methyl acrylate, vinyl acetate, and/or methyl methacrylate | 0-1% of sodium styrene sulfonate, sodium methallyl sulfonate, sodium sulfophenyl methallyl ether, and/or itaconic acid |

An acrylic composition of the present invention may comprise one or more (e.g., 1, 2, 3, 4, 5, or more) acrylonitrile polymer(s). In some embodiments, the acrylic composition may comprise a blend of a polyacrylonitrile homopolymer and at least one polyacrylonitrile copolymer. In some embodiments, the acrylic composition may comprise a blend of at least two different polyacrylonitrile copolymers. A blend of two or more acrylonitrile polymers may comprise the acrylonitrile polymers in any suitable amount, such as e.g., about 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95%, 98%, 99%, or 99.5% based on the total amount of all acrylonitrile polymers present in the acrylic composition.

An acrylonitrile polymer may have any suitable molecular weight. In some embodiments, an acrylonitrile polymer may have a molecular weight in a range from about 40,000 or 90,000 g/mol to about 170,000 or 200,000 g/mol. In some embodiments, an acrylonitrile polymer may have a molecular weight of about 40,000, 50,000, 60,000, 70,000, 80,000, 90,000, 100,000, 110,000, 120,000, 130,000, 140,000, 150,000, 160,000, 170,000, 180,000, 190,000, or 200,000 g/mol.

A "hindered amine light stabilizer" as used herein refers to a compound or polymer comprising a substituted piperidinyl group. In some embodiments, the substituted piperidinyl group may comprise 1, 2, 3, 4, 5, 6, 7, 8, or more substituents, such as, e.g., an alkyl, alkenyl, or alkoxy group. In some embodiments, the substituted piperidinyl group comprises 1 or 2 substituents (e.g., a C1-C20 alkyl or C1-C20 alkenyl group) at the 2- and/or 6-position of the piperidine ring. In some embodiments, the substituted piperidinyl group is a 2,2,6,6-tetraalkylpiperidinyl group (e.g., a 2,2,6,6-tetramethylpiperidinyl group). In some embodiments, the substituted piperidinyl group comprises hydrogen, an alkyl group or an alkoxy group at the 1-position of the piperidine ring. In some embodiments, a hindered amine light stabilizer comprises an amine group that acts through and/or participates in a regenerative free radical scavenging mechanism. In some embodiments, a hindered amine light stabilizer of the present invention is a UV stabilizer.

One or more (e.g., 1, 2, 3, 4, 5, or more) substituted piperidinyl group(s) may be present in a hindered amine light stabilizer. In some embodiments, the hindered amine light stabilizer is a polymer and comprises one or more (e.g., 1, 2, 3, 4, 5, or more) substituted piperidinyl group(s) per repeating unit of the hindered amine light stabilizer. In some embodiments, an acrylic composition of the present invention may comprise a hindered amine light stabilizer that comprises one or more (e.g., 1, 2, 3, 4, or more) 2,2,6,6-tetraalkylpiperidinyl group(s) in the hindered amine light stabilizer. In some embodiments, the hindered amine light stabilizer may be a polymeric or oligomeric hindered amine light stabilizer, and may comprise one or more (e.g., 1, 2, 3, 4, or more) 2,2,6,6-tetraalkylpiperidinyl group(s) per repeating unit of the hindered amine light stabilizer.

A hindered amine light stabilizer may be present in an acrylic composition of the present invention in any suitable amount. In some embodiments, a hindered amine light stabilizer is present in an acrylic composition of the present invention in an amount in a range of about 0.01%, 0.5%, or 1% to about 2%, 3% or 10% by weight of the acrylic composition (e.g., acrylic fiber). In some embodiments, a hindered amine light stabilizer is present in an acrylic composition of the present invention in an amount of about 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, or 10% by weight of the acrylic composition. In some embodiments, one or more (e.g., 1, 2, 3, 4, 5, or more) different hindered amine light stabilizer(s) may be present in the acrylic composition. In some embodiments, a hindered amine light stabilizer may scavenge, bind, trap, and/or remove one or more free radical(s) present in the acrylic composition.

Example hindered amine light stabilizers include, but are not limited to, those under the tradename Tinuvin® commercially available from BASF, such as, e.g., Tinuvin® PA 123, Tinuvin® 371, Tinuvin® 111 and/or Tinuvin® 622; those under the tradename Chimassorb® commercially available from BASF, such as, e.g., Chimassorb® 2020; those under the tradename Uvasorb® commercially available from 3V Sigma USA, such as, e.g., Uvasorb® HA88FD and/or Uvasorb® HA10, and/or those under the tradename Cyasorb® commercially available from Cytec Industries, Inc., such as, e.g., Cyasorb® UV-3529.

A hindered amine light stabilizer may have a pKa in a range from about 2, 2.5, 3, 3.5, or 4 to about 5, 5.5, 6, 6.5, 7, 7.5, or 8. In some embodiments, a hindered amine light stabilizer may have a pKa of about 2, 2.5, 3, 3.5, 4, 4.5, 5, 5.5, 6, 6.5, 7, 7.5, or 8. In some embodiments, the hindered amine light stabilizer has a pKa in a range from about 3.5 to about 4.5 or from about 6 to about 7 or 7.5. The pKa of a hindered amine light stabilizer refers to the acid dissociation constant of the conjugate acid of the hindered amine light stabilizer.

A hindered amine light stabilizer may have any suitable molecular weight. In some embodiments, a hindered amine light stabilizer has a number average molecular weight in a range from about 500, 1000, 2000 or 3000 g/mol to about 4000, 5000, 10,000, or 20,000 g/mol. In some embodiments, a hindered amine light stabilizer has a molecular weight in a range from about 500 or 700 g/mol to about 1000, 2000, or 4500 g/mol. In some embodiments, a hindered amine light stabilizer has a molecular weight of about 500, 600, 700, 800, 900, 1000, 1500, 2000, 2500, 3000, 3500, 4000, or 4500 g/mol. In some embodiments, a hindered amine light stabilizer has an average molecular weight in a range from about 600 or 700 g/mol to about 1000 g/mol or from about 3000 g/mol to about 4000 g/mol and a pKa in a range from about 2, 2.5, 3 or 3.5 to about 5, 5.5, 6, 6.5, 7, 7.5, or 8.

A hindered amine light stabilizer may be soluble in one or more solvents (e.g., a polar organic solvent). In some embodiments, a hindered amine light stabilizer may have a lower solubility in water compared to its solubility in a polar organic solvent, such as, e.g., acetone, N,N-dimethylformamide (DMF), DMAc, acetonitrile, dimethylsulfoxide (DMSO), etc. In some embodiments, a hindered amine light stabilizer may have a water solubility at 20° C. of less than about 2%, 1%, 0.1%, or 0.01% w/w. In some embodiments, a hindered amine light stabilizer may be soluble in a solvent (e.g., acetone, DMF, acetonitrile, DMSO, toluene, dimethyl acetamide (DMAc), etc.) at 20° C. or room temperature in an amount of about 25%, 30%, 35%, 40%, 45%, 50%, 55%, 60%, 65%, 70%, 75%, 80%, 85%, 90%, 95%, or 100% w/w.

In some embodiments, the hindered amine light stabilizer has a structure represented by Formula (I), Formula (II), Formula (III), Formula (IV), or Formula (V):

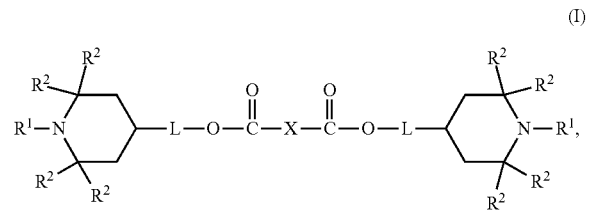

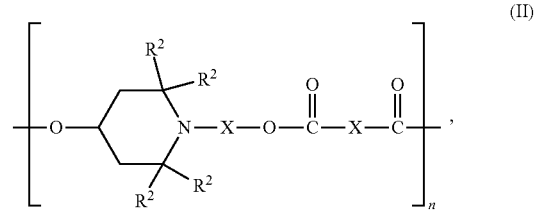

-continued

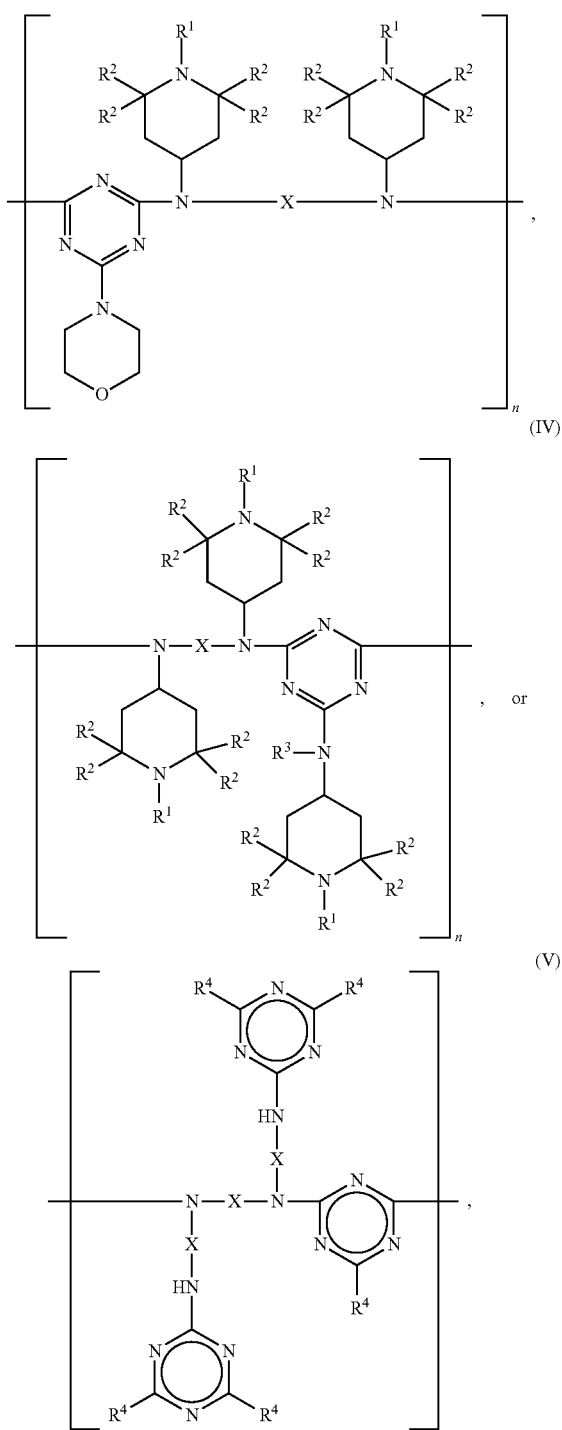

wherein:

each X is independently selected from the group consisting of C1-C20 alkyl and C1-C20 alkenyl;

L, in each instance, is absent or is independently selected from the group consisting of C1-C20 alkyl and C1-C20 alkenyl;

each R¹ is independently selected from the group consisting of hydrogen, C1-C20 alkyl, C1-C20 alkenyl, —O(C1-C20 alkyl), and —O(C1-C20 alkenyl);

each R² is independently selected from the group consisting of hydrogen, C1-C20 alkyl, and C1-C20 alkenyl;

each R³ is independently selected from the group consisting of hydrogen, C1-C20 alkyl, and C1-C20 alkenyl;

each R⁴, if present, has a structure represented by:

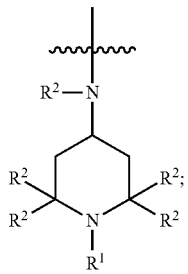

and n is an integer selected from 1 to 1,000,000 (e.g., 1 to 100,000; 1 to 10,000; 1 to 1,000; 1 to 100; 1 to 50, or 1 to 10), and/or wherein n is an integer sufficient to provide a molecular weight in a range of about 500, 1000, 2000 or 3000 g/mol to about 4000, 5000, 10,000, or 20,000 g/mol.

In some embodiments, in a compound of Formula (I), (II), (III), (IV), or (V), R¹ may be —O(C1-C20 alkyl) or —O(C1-C20 alkenyl), and, in some embodiments, R¹ may be —O(C1-C4 alkyl) or —O(C1-C4 alkenyl).

"Alkyl" or "alkyl group," as used herein, means a straight-chain (i.e., unbranched), branched, or cyclic hydrocarbon chain that is completely saturated. In some embodiments, alkyl groups contain 1, 2, 3, 4, 5, 6, 7, 8, 9, 10, 11, 12, 13, 14, 15, 16, 17, 18, 19, or 20 carbon atoms (e.g., C1-4, C2-4, C3-4, C1-5, C2-5, C3-5, C1-6, C2-6, C3-6, C2-7, C1-8, C4-8, C4-20, C6-10, C6-20, C8-10, C8-20, etc.). In some embodiments, an alkyl group contains 1-8 carbon atoms. In some embodiments, an alkyl group contains 1-6 carbon atoms. In some embodiments, an alkyl group contains 6-20 carbon atoms. In some embodiments, an alkyl group contains 2-3 carbon atoms, and in some embodiments, an alkyl group contains 1-4 carbon atoms. In some embodiments, the term "alkyl" or "alkyl group" means a straight-chain (i.e., unbranched) or branched hydrocarbon chain that is completely saturated. In certain embodiments, the term "alkyl" or "alkyl group" refers to a cycloalkyl group, also known as carbocycle. Non-limiting examples of example alkyl groups include methyl, ethyl, propyl, isopropyl, butyl, cyclopropyl and cyclohexyl.

"Alkenyl" or "alkenyl group," as used herein, refers to a straight-chain (i.e., unbranched), branched, or cyclic hydrocarbon chain that has one or more double bonds. In certain embodiments, an alkenyl group contains 1-20 carbon atoms. In certain embodiments, an alkenyl group contains 1-6 carbon atoms. In some embodiments, an alkenyl group contains 6-20 carbon atoms. In still other embodiments, an alkenyl group contains 1-4 carbon atoms, and in some embodiments, an alkenyl group contains 2-3 carbon atoms. In some embodiments, the term "alkenyl" or "alkenyl group" refers to a straight-chain (i.e., unbranched) or branched hydrocarbon chain that has one or more double bonds. According to some embodiments, the term alkenyl refers to a straight chain hydrocarbon having two double bonds, also referred to as "diene." In other embodiments, the term "alkenyl" or "alkenyl group" refers to a cycloalkenyl group. Non-limiting examples of alkenyl groups include —CH=CH₂, —CH₂CH=CH₂ (also referred to as allyl), —CH═CHCH$_3$, CH$_2$CH$_2$CH═CH$_2$, —CH$_2$CH═CHCH$_3$, —CH═CH$_2$CH$_2$CH$_3$, —CH═CH$_2$CH═CH$_2$, and cyclobutenyl.

In some embodiments, an acrylic composition of the present invention comprises a hindered amine light stabilizer having a structure represented by Formula (I). In some embodiments, in the compound of Formula (I), L may be absent or a C1-C4 alkyl; X may be a C4-C12 alkyl, C6-C10 alkyl, C4-C12 alkenyl, or C6-C10 alkenyl; each $R^1$ is independently a C4-C12 alkyl, C6-C10 alkyl, C4-C12 alkenyl, C6-C10 alkenyl, —O(C4-C12 alkyl), —O(C4-C12 alkenyl), —O(C6-C10 alkyl), or —O(C6-C10 alkenyl); and/or each $R^2$ is independently a C1-C4 alkyl or C1-C4 alkenyl. In some embodiments, in the compound of Formula (I), L may be absent; X may be a C6-C10 alkyl; each $R^1$ is independently a —O(C6-C10 alkyl); and/or each $R^2$ is independently a C1-C4 alkyl. In some embodiments, in the compound of Formula (I), L may be absent; X may be a C8 alkyl; each $R^1$ is a —O(C8 alkyl); and/or each $R^2$ is a methyl group. In some embodiments, in the compound of Formula (I), each L is the same, each $R^1$ is the same, and/or each $R^2$ is the same.

In some embodiments, an acrylic composition of the present invention comprises a hindered amine light stabilizer having a structure represented by Formula (Ia):

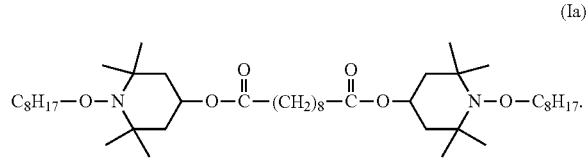

(Ia)

In some embodiments, an acrylic composition of the present invention comprises a hindered amine light stabilizer having a structure represented by Formula (II). In some embodiments, each X is independently a C1-C6 alkyl, C1-C4 alkyl, C1-C6 alkenyl, or C1-C4 alkenyl; each $R^2$ is independently a C1-C4 alkyl or C1-C4 alkenyl; and/or n is 1 to 100 or 1 to 15. In some embodiments, in the compound of Formula (II), each X is independently a C1-C4 alkyl; each $R^2$ is independently a C1-C4 alkyl; and/or n is 1 to 15. In some embodiments, in the compound of Formula (II), each X is a C2 alkyl; each $R^2$ is a methyl group; and/or n is 1 to 15. In some embodiments, in the compound of Formula (II), each X is the same and/or each $R^2$ is the same.

In some embodiments, an acrylic composition of the present invention comprises a hindered amine light stabilizer having a structure represented by Formula (IIa):

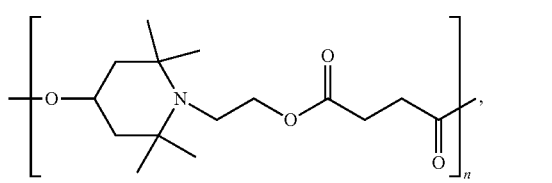

(IIa)

optionally wherein n is 9, 10, 11, 12, 13, or 14.

In some embodiments, an acrylic composition of the present invention comprises a hindered amine light stabilizer having a structure represented by Formula (III). In some embodiments, in the compound of Formula (III), X may be a C1-C10 alkyl, C1-C8 alkyl, C1-C10 alkenyl, or C1-C8 alkenyl; each $R^1$ is independently a C1-C6 alkyl, C1-C4 alkyl, C1-C6 alkenyl, C1-C4 alkenyl, —O(C1-C6 alkyl), —O(C1-C6 alkenyl), —O(C1-C4 alkyl), or —O(C1-C4 alkenyl); each $R^2$ is independently a C1-C4 alkyl or C1-C4 alkenyl; and/or n is 1 to 16 or 1 to 5. In some embodiments, in the compound of Formula (III), X may be a C1-C8 alkyl; each $R^1$ is independently a C1-C4 alkyl; each $R^2$ is independently a C1-C4 alkyl; and/or n is 1 to 5. In some embodiments, in the compound of Formula (III), X may be a C6 alkyl; each $R^1$ is a methyl group; each $R^2$ is a methyl group; and/or n is 1 to 5. In some embodiments, in the compound of Formula (III), each $R^1$ is the same and/or each $R^2$ is the same.

In some embodiments, an acrylic composition of the present invention comprises a hindered amine light stabilizer having a structure represented by Formula (IIIa):

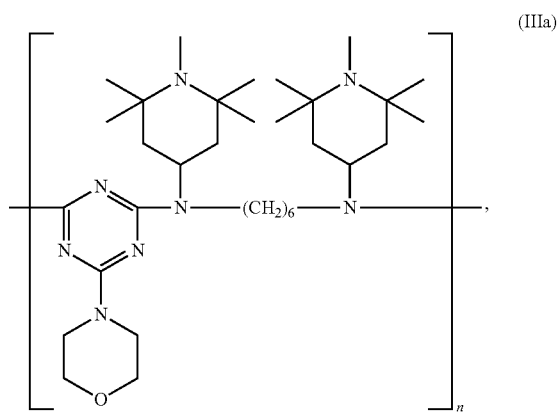

(IIIa)

optionally wherein n is 2, 3, 4, or 5.

In some embodiments, an acrylic composition of the present invention comprises a hindered amine light stabilizer having a structure represented by Formula (IV). In some embodiments, in the compound of Formula (IV), X may be a C2-C12 alkyl, C2-C8 alkyl, C2-C12 alkenyl, or C2-C8 alkenyl; each $R^1$ is independently hydrogen, C1-C4 alkyl, C1-C4 alkenyl, —O(C1-C4 alkyl), or —O(C1-C4 alkenyl); each $R^2$ is independently a C1-C4 alkyl or C1-C4 alkenyl; $R^3$ is a C1-C10 alkyl, C1-C8 alkyl, C1-C10 alkenyl, or C1-C8 alkenyl; and/or n is 1 to 100 or 1 to 10. In some embodiments, in the compound of Formula (IV), X may be a C2-C8 alkyl; each $R^1$ is independently hydrogen or a C1-C4 alkyl; each $R^2$ is independently a C1-C4 alkyl; $R^3$ is a C1-C8 alkyl; and/or n is 1 to 10. In some embodiments, in the compound of Formula (IV), X may be a C6 alkyl; each $R^1$ is hydrogen; each $R^2$ is independently a methyl group; $R^3$ is a C4 alkyl; and/or n is 1 to 10. In some embodiments, in the compound of Formula (IV), each $R^1$ is the same and/or each $R^2$ is the same.

In some embodiments, an acrylic composition of the present invention comprises a hindered amine light stabilizer having a structure represented by Formula (IVa):

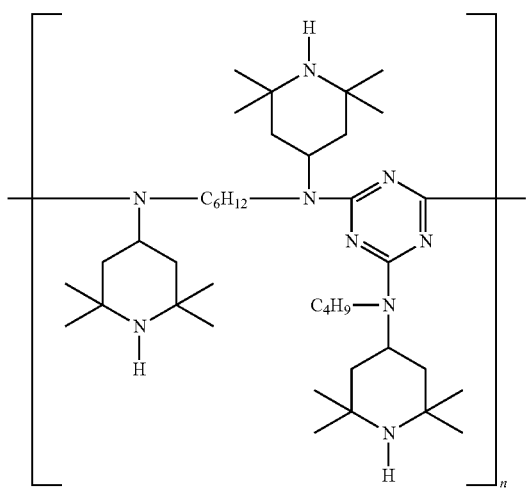

(IVa)

optionally wherein n is 2, 3, 4, 5, 6, 7, or 8.

In some embodiments, an acrylic composition of the present invention comprises a hindered amine light stabilizer having a structure represented by Formula (V). In some embodiments, in the compound of Formula (V), each X is independently a C2-C8 alkyl, C2-C4 alkyl, C2-C8 alkenyl, or C2-C4 alkenyl; each $R^1$ is independently hydrogen, C1-C4 alkyl, C1-C4 alkenyl, —O(C1-C4 alkyl), or —O(C1-C4 alkenyl); each $R^2$ is independently a C1-C4 alkyl or C1-C4 alkenyl; and/or n is 1 to 50, 1 to 10, or 1 to 5. In some embodiments, in the compound of Formula (V), each X is independently a C1 alkyl, C2 alkyl, C3 alkyl, of C4 alkyl; each $R^1$ is independently hydrogen or a C1-C4 alkyl; each $R^2$ is independently a C1-C4 alkyl; and/or n is 1 to 10 or 1 to 5. In some embodiments, in the compound of Formula (V), each X is independently a C2 alkyl or C3 alkyl; each $R^1$ is hydrogen; each $R^2$ is a methyl group; and/or n is 1 to 10. In some embodiments, in the compound of Formula (V), each $R^1$ is the same and/or each $R^2$ is the same.

In some embodiments, an acrylic composition of the present invention comprises a hindered amine light stabilizer having a structure represented by Formula (Va):

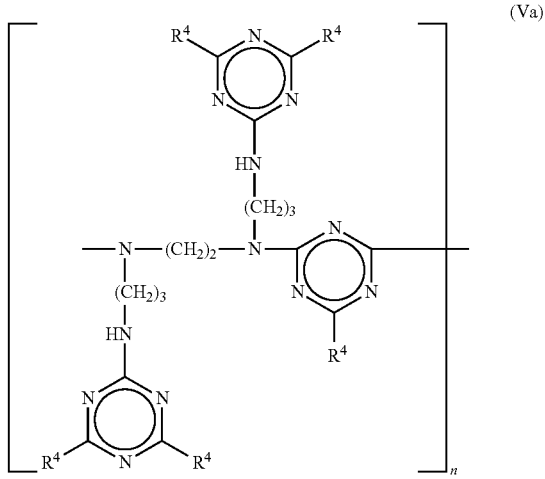

(Va)

wherein each $R^4$ has a structure represented by:

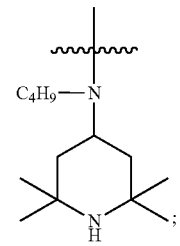

and n is an integer selected from 1, 2, 3, 4, 5, 6, 7, 8, 9, or 10.

A hindered amine light stabilizer may be distributed and/or incorporated throughout an acrylic composition of the present invention. In some embodiments, the hindered amine light stabilizer is distributed and/or incorporated substantially uniformly throughout the acrylic composition (i.e., a concentration in a first portion (e.g., an outer portion) and a concentration in a second portion (e.g., an inner portion or core) are within ±20% of each other). In some embodiments, when the acrylic composition is in the form of a fiber, the hindered amine light stabilizer is distributed and/or incorporated substantially uniformly throughout the fiber and/or may be found in the center of the fiber to the outer surface of the fiber. In some embodiments, when the acrylic composition is in the form of a fiber, a first hindered amine light stabilizer may be present at, proximate to, and/or concentrated at or near a surface of the fiber and a second hindered amine light stabilizer may be distributed substantially uniformly throughout the fiber. In some embodiments, the hindered amine light stabilizer is within the acrylic fiber and/or within the polymer matrix of the acrylic fiber. In some embodiments, the hindered amine light stabilizer is distributed throughout the polymer matrix of the acrylonitrile polymer.

A hindered amine light stabilizer may or may not be chemically bound to an acrylonitrile polymer present in the acrylic composition. In some embodiments, the hindered amine light stabilizer may be ionically and/or covalently bound to a portion of the acrylonitrile polymer. In some embodiments, the hindered amine light stabilizer may be associated with a portion of the acrylonitrile polymer through hydrogen bonding, a Van deer Waals force, and/or a dipole interaction. In some embodiments, a hindered amine light stabilizer may be entrapped and/or encapsulated (partially or entirely) by one or more portions and/or chains of an acrylonitrile polymer in an acrylic composition of the present invention. In some embodiments, a hindered amine light stabilizer may not be chemically reacted and/or bound to the acrylonitrile polymer, but may physically be partially or entirely entrapped and/or encapsulated by the acrylonitrile polymer.

An acrylic composition of the present invention may be in any suitable form, such as, e.g., in the form of a fiber, thread, yam, and/or fabric. In some embodiments, the acrylic composition is an outdoor fabric and/or is a fabric that is suitable for outdoor applications (e.g., shade structures, awnings, marine covers, sails, outdoor furniture, etc.). In some embodiments, the acrylic composition is a fabric such as, e.g., an automotive fabric, which may be an interior and/or exterior automotive fabric. In some embodiments, an acrylic composition of the present invention is a fabric comprising an acrylic fiber, thread, and/or yarn. Also provided herein is an article, such as, but not limited to, a shade structure, awning, marine cover, outdoor furniture item, car, boat, chair, sail, and/or couch, comprising an acrylic composition of the present invention (e.g., a fiber, yarn, thread, and/or fabric).

In some embodiments, one or more (e.g., 1, 2, 3, 4, 5, 6, or more) pigment(s) may be present in the acrylic composition. In some embodiments, an acrylic composition comprises at least 2, 3, 4, or more pigments. In some embodiments, the acrylic composition is solution-dyed. In some embodiments, the acrylic composition is unpigmented (also referred to herein as ecru or natural).

One or more (e.g., 1, 2, 3, 4, 5, or more) additional component(s) or additive(s) may be present in an acrylic composition of the present invention including, but not limited to, a heat stabilizer, catalyst, solvent, and/or impurity (e.g., residual catalyst, residual solvent, etc.). In some embodiments, a heat stabilizer (e.g., an antioxidant) may be present in an acrylic composition of the present invention in an amount known to those of skill in the art.

The inventors of the present invention discovered that a hindered amine light stabilizer can be included in an acrylic composition comprising an acrylonitrile polymer (e.g., a polyacrylonitrile homopolymer and/or copolymer) and may provide improved properties. As described herein, it was unexpected that improvements could be made (e.g., improvements in weatherability, UV-resistance, color stability, etc.) while maintaining or increasing fiber strength properties (e.g., tensile strength, flexibility, etc.).

An acrylic composition (e.g., fabric) of the present invention may have a UV-resistance that is increased by at least about 10% (e.g., at least about 20%, 30%, or more) compared to a comparative composition. In some embodiments, increased UV-resistance may be determined with an unpigmented acrylic composition of the present invention and an unpigmented comparative composition. For example, an unpigmented acrylic composition of the present invention and an unpigmented comparative composition and/or one or more properties thereof may be compared.

"Comparative composition" as used herein collectively refers to a current commercial acrylic composition and/or a control composition, each of which may be in the same form as the acrylic composition of the present invention that it is being compared to. An example current commercial acrylic composition of the same form may be, but is not limited to, a current commercial acrylic fabric (e.g., a current commercial acrylic outdoor fabric) when the acrylic composition of the present invention is a fabric. An example control composition of the same form is when the acrylic composition of the present invention is in the form of, e.g., a fabric, the control composition is a fabric prepared in the same manner with the same materials except without a hindered amine light stabilizer. Similarly, when the acrylic composition of the present invention is a fiber or yarn, the control composition is a fiber or yarn, respectively, prepared in the same manner with the same materials except without a hindered amine light stabilizer. In some embodiments, a comparative composition has a composition as provided in Table 1.

In some embodiments, an acrylic composition (e.g., fabric) of the present invention has a color stability that is increased by at least about 10% (e.g., at least about 20%, 30%, or more) compared to a current commercial acrylic composition of the same form (e.g., a current commercial acrylic fabric) and/or a control composition of the same form (e.g., a fabric without a hindered amine light stabilizer). In some embodiments, improvements in color stability may be determined upon visual comparison with the human eye. In some embodiments, increased color stability may be determined with an unpigmented acrylic composition of the present invention and/or an unpigmented comparative composition, e.g., by comparing the compositions and/or one or more properties thereof.

An acrylic composition (e.g., fabric) of the present invention may have reduced or no discoloration (e.g., yellowing or browning) compared to a current commercial acrylic composition of the same form (e.g., a current commercial acrylic fabric) and/or a control composition of the same form (e.g., a fabric without a hindered amine light stabilizer). In some embodiments, the acrylic composition has a reduction in discoloration of at least about 5%, 10%, 15%, 20%, 25%, 30%, 35%, 40%, 45%, 50%, or more compared to a comparative composition. In some embodiments, discoloration may be determined with an unpigmented acrylic composition of the present invention and/or an unpigmented comparative composition. "Discoloration" as used herein, refers to any change in color compared to the initial (i.e., original) color of the acrylic composition upon formation of the acrylic composition (i.e., at time point 0). In some embodiments, discoloration may appear as a change in the color (e.g., a change to a different shade and/or a color shift) of the acrylic composition, fading of the color of the acrylic composition, staining of the acrylic composition, and/or yellowing or browning of the acrylic composition (i.e., the appearance of yellow or brown in the acrylic composition).

In some embodiments, an acrylic composition (e.g., fabric) of the present invention may have reduced or no discoloration (e.g., yellowing or browning) after a period of time and/or after exposure to certain conditions compared to the original color of the acrylic composition. When compared to the original color of the acrylic composition, an acrylic composition of the present invention may have no discoloration or a reduction in discoloration of at least about 5%, 10%, 15%, 20%, 25%, 30%, 35%, 40%, 45%, 50%, or more after a period of time and/or after exposure to certain conditions. The amount of discoloration may be determined and/or measured at any point in time, such as, e.g., at about 1, 2, 3, 4, 5, 6, 7, 8, 9, 10, 11, 12, 13, 14, 15, 16, 17, 18, 19, 20, 21, 22, 23, 24 month(s) or year(s) or more after initial formation of the acrylic composition. In some embodiments, the amount of discoloration may be determined and/or measured after exposure to certain conditions, such as, but not limited to, real world outdoor conditions (e.g., in California, Arizona and/or Texas), sun exposure, heat exposure, and/or conditions in accordance with AATCC 169 Option 3 (AATCC TM169-2009, "Weather Resistance of Textiles: Xenon Lamp Exposure" Developed in 1987 by AATCC Committee RA64 (editorially revised and reaffirmed 2009)). In some embodiments, discoloration of an acrylic composition of the present invention is determined and/or measured after the acrylic composition is exposed to 880, 1320, or 2200 kJ in accordance with AATCC 169 Option 3. In some embodiments, the AATCC 169 Option 3 test method is performed using a borosilicate/borosilicate filter with 0.35 W/m$^2$ irradiance at 340 nm, 77° C.+3° C. black panel temperature, 27+3% relative humidity (RH) with continuous light exposure.

In some embodiments, an acrylic composition of the present (e.g., fabric) has a weatherability that is increased by at least 5% (e.g., about 10%, 15%, 20%, 25%, 30%, or more) compared to a current commercial acrylic composition of the same form (e.g., a current commercial acrylic fabric) and/or a control composition of the same form (e.g., a fabric without a hindered amine light stabilizer). Weatherability may be measured using methods known to those of skill in the art, such as, but not limited to, artificial simulations of weathering using a xenon arc such as, e.g., AATCC 169

Option 3 (AATCC TM169-2009, "Weather Resistance of Textiles: Xenon Lamp Exposure" Developed in 1987 by AATCC Committee RA64 (editorially revised and reaffirmed 2009); AATCC Test Method 16.3-2014 "Colorfastness to Light: Xenon-Arc"; SAE J2527 "Performance Based Standard for Accelerated Exposure of Automotive Exterior Materials Using a Controlled Irradiance Xenon-Arc Apparatus" J2527_200402, Issued: 2004-02-11; ISO 105-B04: 1994 "Textiles—Tests for colour fastness—Part B04: Colour fastness to artificial weathering: Xenon arc fading lamp test"; ISO 105-B02:2014(en) "Textiles—Tests for colour fastness—Part B02: Colour fastness to artificial light: Xenon arc fading lamp test"; and ASTM G154-16, "Standard Practice for Operating Fluorescent Ultraviolet (UV) Lamp Apparatus for Exposure of Nonmetallic Materials," ASTM International, West Conshohocken, PA, 2016. In some embodiments, weatherability, color stability and/or one or more physical properties of an acrylic composition of the present invention may be tested in regard to resistance to acid, rain, salt, pollutant(s), and/or chemical(s) using methods known to those of skill in the art.

The weatherability may be measured and/or determined upon initial formation of the composition and/or at about 1, 2, 3, 4, 5, 6, 7, 8, 9, 10, 11, 12, 13, 14, 15, 16, 17, 18, 19, 20, 21, 22, 23, 24 month(s) or year(s) or more after initial formation of the composition and/or after exposure to certain conditions, such as, but not limited to, real world outdoor conditions (e.g., in California, Arizona and/or Texas), sun exposure, heat exposure, and/or conditions in accordance with AATCC 169 Option 3. In some embodiments, the acrylic composition has a weatherability that is increased by at least 5%, 10%, 15%, or 20% at about 3, 6, 9, or 12 months or 5 or 10 years (e.g., 3, 6, 9, or 12 months or 5 or 10 years of outdoor exposure) and/or after exposure to 880, 1320, or 2200 kJ in accordance with AATCC 169 Option 3 compared to a comparative composition. In some embodiments, improvements in weatherability of an acrylic composition of the present invention compared to a comparative composition may be determined by comparing the tensile strength, break strength, and/or flexibility of the compositions. In some embodiments, weatherability may be determined with an unpigmented acrylic composition of the present invention and/or an unpigmented comparative composition, e.g., by comparing the compositions and/or one or more properties thereof.

UV-resistance, color stability, weatherability, and/or discoloration may be measured and/or determined using methods known to those of skill in the art. In some embodiments, UV-resistance, color stability, weatherability, and/or discoloration may be measured and/or determined by measuring and/or determining the difference and/or distance between a first color (e.g., a first color value) and a second color (e.g., a second color value). In some embodiments, the difference and/or distance between a first color and a second color may be measured and/or determined by measuring and/or determining the CIE Delta E and/or Gray Scale value. The CIE Delta E values are CIELAB units of color change as determined by AATCC 169 Option 3. In some embodiments, the CIE Delta E and/or Gray Scale value may be determined in accordance with AATCC Evaluation Procedure 6, "Instrumental Color Measurement" and/or AATCC Evaluation Procedure 1, "Gray Scale for Color Change". The first color and second color may be from the same composition, but at different points in time and/or after exposure to certain conditions (e.g., same sample tested at different times). In some embodiments, the first color and second color are the same. In some embodiments, the first color may be the initial color of the acrylic composition and the second color may be the color of the acrylic composition after a period of time and/or exposure to certain conditions. In some embodiments, the first color may be the color of the acrylic composition after a period of time and/or after exposure to certain conditions and the second color may be the color of a comparative composition of the same form after the same period of time and/or after exposure to the same conditions. In some embodiments, a CIE Delta E and/or Gray Scale value may be determined after exposure for at least about 7 days to a temperature of about 85° C. to about 100° C. (e.g., about 85° C.) in forced air oven and/or may be determined in accordance with LP-463LB-13-01, 5-4-2006, "Heat Aging of Trim Materials". In some embodiments, color change and/or a CIE Delta E and/or Gray Scale value may be measured devoid of a pigment (e.g., the acrylic composition is unpigmented), which may allow for any change in color or value to more easily be observed. In some embodiments, an acrylic composition, when measured devoid of a pigment, exhibits no visually perceptive color change after exposure to about 100 kJ of light and/or the acrylic composition, when measured devoid of a pigment, has a Gray scale value of 5 after exposure to about 100 kJ of light.

In some embodiments, an acrylic composition of the present invention may have a CIE Delta E value of about 20, 19, 18, 17, 16, 15, 14, 13, 12, 11, 10, 9, 8, 7, 6, 5, 4, 3, 2, 1, or less when measuring the color of the acrylic composition after a period of time and/or after exposure to certain conditions compared to the initial color of the acrylic composition. In some embodiments, the CIE Delta E is measured at about 1, 2, 3, 4, 5, 6, 7, 8, 9, 10, 11, 12, 13, 14, 15, 16, 17, 18, 19, 20, 21, 22, 23, 24 month(s) or year(s) or more after initial formation of the acrylic composition and/or after exposure to certain conditions, such as, but not limited to, real world outdoor conditions (e.g., in California, Arizona and/or Texas), sun exposure, heat exposure, and/or conditions in accordance with AATCC 169 Option 3. In some embodiments, an acrylic composition of the present invention (e.g., fabric) has a CIE Delta E value of less than about 3, 2, or 1 at about 3, 6, 9, or 12 months or 5 or 10 years (e.g., 3, 6, 9, or 12 months or 5 or 10 years of outdoor exposure) and/or after exposure to 880, 1320, or 2200 kJ in accordance with AATCC 169 Option 3.

In some embodiments, the CIE Delta E of an acrylic composition of the present invention (e.g., a fabric) varies (i.e., increases or decreases) by less than about ±70%, 65%, 60%, 55%, 50%, 45%, 40%, 35%, 30%, 25%, 20%, 15%, 10%, or 5% after a period of time and/or after exposure to certain conditions compared to a prior CIE Delta E value for the acrylic composition. For example, in some embodiments, the CIE Delta E value at about 3 months varies by less than about ±70% compared to the CIE Delta E value at about 6, 9, 12, 18, or 24 months and/or the CIE Delta E value after exposure to 880 kJ varies by less than about ±70% compared to the CIE Delta E value after exposure to 2200 kJ in accordance with AATCC 169 Option 3. In some embodiments, an acrylic composition of the present invention (e.g., fabric) has a CIE Delta E value that varies by less than about ±70%, 65%, 60%, 55%, 50%, 45%, 40%, 35%, 30%, 25%, 20%, 15%, 10%, or 5% at about 3, 6, 9, and/or 12 months and/or 5 and/or 10 years (e.g., 3, 6, 9, or 12 months or 5 or 10 years of outdoor exposure) and/or after exposure to 880, 1320, and/or 2200 kJ in accordance with AATCC 169 Option 3 compared to a prior CIE Delta E value.

In some embodiments, the CIE Delta E of an acrylic composition of the present invention (e.g., a fabric) varies by less than about ±70%, 65%, 60%, 55%, 50%, 45%, 40%, 35%, 30%, 25%, 20%, 15%, 10%, or 5% over a 12 month time period during which the acrylic composition is exposed to certain conditions, such as, but not limited to, real world outdoor conditions (e.g., in California, Arizona and/or Texas), sun exposure, heat exposure, and/or conditions in accordance with AATCC 169 Option 3. The variance over the 12 month time period (e.g., 12 months after initial formation of the acrylic composition) may be determined by comparing the lowest CIE Delta E value and highest CIE Delta E value measured during the 12 month period to determine the percent difference. In some embodiments, the CIE Delta E value increases by less than about +70%, 65%, 60%, 55%, 50%, 45%, 40%, 35%, 30%, 25%, 20%, 15%, 10%, or 5% during the 12 month time period.

In some embodiments, the CIE Delta E of an acrylic composition of the present invention (e.g., a fabric) increases by less than about 70%, 65%, 60%, 55%, 50%, 45%, 40%, 35%, 30%, 25%, 20%, 15%, 10%, 5%, 1%, or 0% after a period of time and/or after exposure to certain conditions compared to a prior CIE Delta E value. For example, in some embodiments, the CIE Delta E value at 3 months increases by less than about 70% compared to the CIE Delta E value at 6, 9, 12, 18, or 24 months and/or the CIE Delta E value after exposure to 880 kJ increases by less than about 70% compared to the CIE Delta E value after exposure to 2200 kJ in accordance with AATCC 169 Option 3. In some embodiments, an acrylic composition of the present invention (e.g., fabric) has a CIE Delta E value that increases by less than about 70%, 65%, 60%, 55%, 50%, 45%, 40%, 35%, 30%, 25%, 20%, 15%, 10%, 5%, 1%, or 0% at about 3, 6, 9, and/or 12 months and/or 5 and/or 10 years (e.g., 3, 6, 9, or 12 months or 5 or 10 years of outdoor exposure) and/or after exposure to 880, 1320, and/or 2200 kJ in accordance with AATCC 169 Option 3 compared to a prior CIE Delta E value.

In some embodiments, an increase in UV-resistance, weatherability, and/or color stability and/or a reduction in discoloration is determined by comparing the CIE Delta E for an acrylic composition of the present invention and the CIE Delta E for a comparative composition (e.g., a control composition of the same form), wherein the CIE Delta E for each is measured after a period of time and/or after exposure to certain conditions compared to the initial color of each composition. An increase in UV-resistance, weatherability, and/or color stability and/or a reduction in discoloration may be demonstrated by the acrylic composition having a lower CIE Delta E value than the CIE Delta E value of the comparative composition, optionally at the same point in time and/or after exposure to the same conditions. In some embodiments, the acrylic composition may have a CIE Delta E value that is lower by at least about 5%, 10%, 15%, 20%, 25%, 30%, 35%, 40%, 45%, 50%, 55%, 60%, 65%, 70% or more compared to the CIE Delta E value of the comparative composition, optionally at the same point in time and/or after exposure to the same conditions.

In some embodiments, an acrylic composition of the present invention may have a Gray Scale value of about 2.5, 3, 3.5, 4, 4.5, or 5 when measuring the color of the acrylic composition after a period of time and/or after exposure to certain conditions compared to the initial color of the acrylic composition. In some embodiments, the Gray Scale value is measured at about 1, 2, 3, 4, 5, 6, 7, 8, 9, 10, 11, 12, 13, 14, 15, 16, 17, 18, 19, 20, 21, 22, 23, 24 month(s) or year(s) or more after initial formation of the acrylic composition and/or after exposure to certain conditions, such as, but not limited to, real world outdoor conditions (e.g., in California, Arizona and/or Texas), sun exposure, heat exposure, and/or conditions in accordance with AATCC 169 Option 3. In some embodiments, an acrylic composition of the present invention (e.g., fabric) has a Gray Scale value of about 3.5, 4, 4.5, or 5 at about 3, 6, 9, or 12 months or 5 or 10 years (e.g., 3, 6, 9, or 12 months or 5 or 10 years of outdoor exposure) and/or after exposure to 880, 1320, or 2200 kJ in accordance with AATCC 169 Option 3.

In some embodiments, the Gray Scale value of an acrylic composition of the present invention (e.g., a fabric) varies by +0, 0.5, 1, 1.5, or 2 after a period of time and/or after exposure to certain conditions compared to the initial color of the acrylic composition. In some embodiments, an acrylic composition of the present invention (e.g., fabric) has a Gray Scale value that varies by +0, 0.5, 1, 1.5, or 2 at about 3, 6, 9, or 12 months or 5 or 10 years (e.g., 3, 6, 9, or 12 months or 5 or 10 years of outdoor exposure) and/or after exposure to 880, 1320, or 2200 kJ in accordance with AATCC 169 Option 3.

In some embodiments, an increase in UV-resistance, weatherability, and/or color stability and/or a reduction in discoloration is determined by comparing the Gray Scale value for an acrylic composition of the present invention and the Gray Scale value for a comparative composition (e.g., a control composition of the same form), wherein the Gray Scale value for each is measured after a period of time and/or after exposure to certain conditions compared to the initial color of each composition. An increase in UV-resistance, weatherability, and/or color stability and/or a reduction in discoloration may be demonstrated by the acrylic composition having a higher Gray Scale value than the Gray Scale value of the comparative composition, optionally at the same point in time and/or after exposure to the same conditions. In some embodiments, the acrylic composition may have a Gray Scale value that is higher by at least 0.5, 1, 1.5, 2, 2.5, 3, 3.5, or 4 compared to the Gray Scale value of the comparative composition, optionally at the same point in time and/or after exposure to the same conditions.

As described above, it was surprisingly discovered by the inventors of the present invention that not only could color stability and/or discoloration of an acrylic composition be improved by including a hindered amine light stabilizer, but also that one or more physical properties of the acrylic composition could be retained or improved. Inclusion of an additive may negatively affect one or more physical properties of the fiber (e.g., tensile strength, break strength, flexibility, etc.). In contrast, the inventors of the present invention discovered that one or more physical properties such as, e.g., strength and/or elongation retention, may be greater after exposure to certain conditions (e.g., after exposure to 100, 250, 500, 880, 1320, or 2200 kJ in accordance with AATCC 169 Option 3) when a hindered amine light stabilizer is included in an acrylic composition of the present invention compared a control composition without the hindered amine light stabilizer. In some embodiments of the present invention, no or minimal reduction in fine physical structures and/or properties is observed. In some embodiments, an acrylic composition of the present invention (e.g., fabric) has a strength retention that is increased by at least 5% or 10% (e.g., about 5%, 10%, 15%, 20%, 25%, 30%, or more) compared to a current commercial acrylic composition of the same form (e.g., a current commercial acrylic fabric) and/or a control composition of the same form (e.g., a fabric without a hindered amine light stabilizer). Strength retention may be measured in accordance with AATCC 169 Option 3.

In some embodiments, an acrylic composition of the present invention (e.g., fabric) has a tensile strength that is increased by at least 5% (e.g., about 10%, 15%, 20%, 25%, 30%, or more) compared to a current commercial acrylic composition of the same form (e.g., a current commercial acrylic fabric) and/or a control composition of the same form (e.g., a fabric without a hindered amine light stabilizer). Tensile strength may be measured in accordance with ASTM D2256/D2256M-10(2015), Standard Test Method for Tensile Properties of Yarns by the Single-Strand Method, ASTM International, West Conshohocken, PA, 2015 and/or ASTM D5035-11(2015), Standard Test Method for Breaking Force and Elongation of Textile Fabrics (Strip Method), ASTM International, West Conshohocken, PA, 2015. Tensile strength of a fabric may be measured in the machine direction and/or the cross machine direction of the fabric structure. The tensile strength may be measured and/or determined upon initial formation of the composition and/or at about 1, 2, 3, 4, 5, 6, 7, 8, 9, 10, 11, 12, 13, 14, 15, 16, 17, 18, 19, 20, 21, 22, 23, 24 month(s) or year(s) or more after initial formation of the composition and/or after exposure to certain conditions, such as, but not limited to, real world outdoor conditions (e.g., in California, Arizona and/or Texas), sun exposure, heat exposure, and/or conditions in accordance with AATCC 169 Option 3. In some embodiments, the acrylic composition has a tensile strength that is increased by at least 5%, 10%, 15%, or 20% at about 3, 6, 9, or 12 months or 5 or 10 years (e.g., 3, 6, 9, or 12 months or 5 or 10 years of outdoor exposure) and/or after exposure to 880, 1320, or 2200 kJ in accordance with AATCC 169 Option 3 compared to a comparative composition (e.g., a control composition of the same form). In some embodiments, after exposure to 880, 1320, or 2200 kJ in accordance with AATCC 169 Option 3, the acrylic composition (e.g., fiber or yarn (e.g., a 10" yarn sample)) may be wrapped in one layer thickness around a 5.5" polystyrene plaque and tested on tensile tester (e.g., an Intron tensile tester) for tensile strength, and the results may be done in replicate and averaged. In some embodiments, tensile strength may be determined with an unpigmented acrylic composition of the present invention and/or an unpigmented comparative composition, e.g., by comparing the compositions and/or one or more properties thereof.

In some embodiments, the tensile strength an acrylic composition of the present invention (e.g., a fabric) varies by about 0% or by less than about ±50%, 45%, 40%, 35%, 30%, 25%, 20%, 15%, 10%, 5%, or 1% after a period of time and/or after exposure to certain conditions compared to the initial tensile strength of the acrylic composition. In some embodiments, an acrylic composition of the present invention (e.g., fabric) has a tensile strength that varies by about 0% or by less than about ±50%, 45%, 40%, 35%, 30%, 25%, 20%, 15%, 10%, 5%, or 1% at about 3, 6, 9, or 12 months or 5 or 10 years (e.g., 3, 6, 9, or 12 months or 5 or 10 years of outdoor exposure) and/or after exposure to 880, 1320, or 2200 kJ in accordance with AATCC 169 Option 3.

In some embodiments, an acrylic composition may be in the form of a fiber and/or yarn, such as, e.g., a yarn having a 18/2 Ring Spun Cotton Count, and may have a tensile strength in a range of about 2 lbs/breaking force to about 4 lbs/breaking force, such as, e.g., 2.3 to 3.8 lbs/breaking force, optionally on average. In some embodiments, a fiber and/or yarn may have a tensile strength of about 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, or 4 lbs/breaking force, optionally on average. In some embodiments, the tensile strength of a fiber and/or yarn may be measured using a rate of speed of about 12 inches per minute, optionally using an Intron® system.

In some embodiments, an acrylic composition of the present invention (e.g., fabric) has a break strength and/or flexibility that is increased by at least 5% (e.g., about 10%, 15%, 20%, 25%, 30%, or more) compared to a current commercial acrylic composition of the same form (e.g., a current commercial acrylic fabric) and/or a control composition of the same form (e.g., a fabric without a hindered amine light stabilizer). Break strength and/or flexibility may be measured in accordance with ASTM D5034-09(2013), Standard Test Method for Breaking Strength and Elongation of Textile Fabrics (Grab Test), ASTM International, West Conshohocken, PA, 2013. Break strength and/or flexibility of a fabric may be measured in the machine direction and/or the cross machine direction of the fabric structure: The break strength and/or flexibility may be measured and/or determined upon initial formation of the composition and/or at about 1, 2, 3, 4, 5, 6, 7, 8, 9, 10, 11, 12, 13, 14, 15, 16, 17, 18, 19, 20, 21, 22, 23, 24 month(s) or years(s) or more after initial formation of the composition and/or after exposure to certain conditions, such as, but not limited to, real world outdoor conditions (e.g., in California, Arizona and/or Texas), sun exposure, heat exposure, and/or conditions in accordance with AATCC 169 Option 3. In some embodiments, the acrylic composition has a break strength and/or flexibility that is increased by at least 5%, 10%, 15%, or 20% at about 3, 6, 9, or 12 months or 5 or 10 years (e.g., 3, 6, 9, or 12 months or 5 or 10 years of outdoor exposure) and/or after exposure to 880, 1320, or 2200 kJ in accordance with AATCC 169 Option 3 compared to a comparative composition (e.g., a control composition of the same form). In some embodiments, after exposure to 880, 1320, or 2200 kJ in accordance with AATCC 169 Option 3, the acrylic composition (e.g., fiber or yarn (e.g., a 10" yarn sample)) may be wrapped in one layer thickness around a 5.5" polystyrene plaque and tested on tensile tester (e.g., an Instron tensile tester) for break strength and/or flexibility, and the results may be done in replicate and averaged. In some embodiments, break strength and/or flexibility may be determined with an unpigmented acrylic composition of the present invention and/or an unpigmented comparative composition, e.g., by comparing the compositions and/or one or more properties thereof.

In some embodiments, the break strength and/or flexibility of an acrylic composition of the present invention (e.g., a fabric) varies by about 0% or by less than about ±50%, 45%, 40%, 35%, 30%, 25%, 20%, 15%, 10%, 5%, or 1% after a period of time and/or after exposure to certain conditions compared to the initial break strength and/or flexibility of the acrylic composition. In some embodiments, an acrylic composition of the present invention (e.g., fabric) has a break strength and/or flexibility that varies by about 0% or by less than about ±50%, 45%, 40%, 35%, 30%, 25%, 20%, 15%, 10%, 5%, or 1% at about 3, 6, 9, or 12 months or 5 or 10 years (e.g., 3, 6, 9, or 12 months or 5 or 10 years of outdoor exposure) and/or after exposure to 880, 1320, or 2200 kJ in accordance with AATCC 169 Option 3.

In some embodiments, an acrylic composition may be in the form of a fiber and/or yarn, such as, e.g., a yarn having a 18/2 Ring Spun Cotton Count, and may have a break strength in a range of about 2 lbs/breaking force to about 4 lbs/breaking force, such as, e.g., 2.3 to 3.8 lbs/breaking force, optionally on average, and/or an elongation in a range from about 20% to about 30%, optionally on average. In some embodiments, a fiber and/or yarn may have a break strength of about 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, or 4 lbs/breaking force, optionally on average, and/or an elongation of about 20%, 21%, 22%, 23%, 24%, 25%, 26%, 27%, 28%, 29%, or 30%, optionally on average. Break strength and/or elongation may be measured using methods known to those of skill in the art, such as, e.g., using an Uster Tensoj et. In some embodiments, break strength and/or elongation of a fiber and/or yarn may be measured using a rate of speed of about 12 inches per minute, optionally using an Instron® system.

In some embodiments, an acrylic composition may be in the form of a fiber and the fiber may have a tenacity in a range of about 30 to about 50. In some embodiments, the fiber may have a tenacity of about 30, 31, 32, 33, 34, 35, 36, 37, 38, 39, 40, 41, 42, 43, 44, 45, 46, 47, 48, 49, or 50. Tenacity may be measured using methods known to those of skill in the art, such as, e.g., in accordance with EN ISO 5079 (ISO 5079:1995 "Textile fibres—Determination of breaking force and elongation at break of individual fibres"), optionally using a Textechno Fafegraph HR+Textechno Vibromat ME.

An acrylic composition of the present invention may have reduced or no acrylonitrile polymer degradation compared to a current commercial acrylic composition of the same form (e.g., a current commercial acrylic fabric) and/or a control composition of the same form (e.g., a fabric without a hindered amine light stabilizer). In some embodiments, acrylonitrile polymer degradation may be measured and/or determined by measuring and/or determining the amount of low molecular weight chains present in the acrylic composition after a period of time and/or after exposure to certain conditions compared to the initial amount of low molecular weight chains present in the acrylic composition. In some embodiments, acrylonitrile polymer degradation may be measured and/or determined by measuring and/or determining the amount of a moiety, functional group, and/or impurity present in the acrylic composition after a period of time and/or after exposure to certain conditions compared to the initial amount of the moiety, functional group, and/or impurity present in the acrylic composition. In some embodiments, the moiety, functional group, and/or impurity may be a degradation product resulting from attack on the polymer (e.g., polymer backbone) by oxygen and/or a nucleophilic agent, a degradation product resulting from a hydrolysis and/or oxidation reaction, and/or may be the result and/or product of a β-ketonitrile defect in the polymer chain (e.g., one introduced during polymerization). In some embodiments, the moiety, functional group, and/or impurity may comprise a double bond. In some embodiments, polymer degradation (e.g., the formation of low molecular weight chains present in the acrylic composition) may be measured and/or determined upon initial formation of the composition and at about 1, 2, 3, 4, 5, 6, 7, 8, 9, 10, 11, 12, 13, 14, 15, 16, 17, 18, 19, 20, 21, 22, 23, 24 month(s) or year(s) or more after initial formation of the composition and/or after exposure to certain conditions, such as, but not limited to, real world outdoor conditions (e.g., in California, Arizona and/or Texas), sun exposure, heat exposure, and/or conditions in accordance with AATCC 169 Option 3. In some embodiments, improvements in polymer degradation of an acrylic composition of the present invention compared to a comparative composition may be determined by comparing the tensile strength, break strength, and/or flexibility of the compositions. In some embodiments, polymer degradation may be determined with an unpigmented acrylic composition of the present invention and/or an unpigmented comparative composition, e.g., by comparing the compositions and/or one or more properties thereof. Methods known to those of skill in the art including, but not limited to, Fourier-transform infrared spectroscopy (FTIR), Gas chromatography-mass spectrometry (GCMS), surface techniques, microscopy, and/or molecular weight analysis may be used to determine and/or measure polymer degradation.

In some embodiments, an acrylic composition of the present (e.g., fabric) has a thermal stability that is increased by at least 5% (e.g., about 10%, 15%, 20%, 25%, 30%, or more) compared to a current commercial acrylic composition of the same form (e.g., a current commercial acrylic fabric) and/or a control composition of the same form (e.g., a fabric without a hindered amine light stabilizer). The thermal stability may be measured and/or determined upon initial formation of the composition and/or at about 1, 2, 3, 4, 5, 6, 7, 8, 9, 10, 11, 12, 13, 14, 15, 16, 17, 18, 19, 20, 21, 22, 23, 24 month(s) or year(s) or more after initial formation of the composition and/or after exposure to certain conditions, such as, but not limited to, real world outdoor conditions (e.g., in California, Arizona and/or Texas), sun exposure, heat exposure, and/or conditions in accordance with AATCC 169 Option 3. In some embodiments, the acrylic composition has a thermal stability that is increased by at least 5%, 10%, 15%, or 20% at about 3, 6, 9, or 12 months or 5 or 10 years (e.g., 3, 6, 9, or 12 months or 5 or 10 years of outdoor exposure) and/or after exposure to 880, 1320, or 2200 kJ in accordance with AATCC 169 Option 3 compared to a comparative composition. In some embodiments, improvements in thermal stability of an acrylic composition of the present invention compared to a comparative composition may be determined by comparing the tensile strength, break strength, and/or flexibility of the compositions. In some embodiments, thermal stability may be determined with an unpigmented acrylic composition of the present invention and/or an unpigmented comparative composition, e.g., by comparing the compositions and/or one or more properties thereof.

An acrylic composition of the present invention may have reduced or no photooxidation compared to a current commercial acrylic composition of the same form (e.g., a current commercial acrylic fabric) and/or a control composition of the same form (e.g., a fabric without a hindered amine light stabilizer). In some embodiments, photooxidation may be measured and/or determined by measuring and/or determining the amount of a moiety, functional group, and/or impurity present in the acrylic composition after a period of time and/or after exposure to certain conditions compared to the initial amount of the moiety and/or functional group present in the acrylic composition. In some embodiments, the moiety, functional group, and/or impurity may comprise a double bond. In some embodiments, photooxidation may be measured and/or determined upon initial formation of the composition and at about 1, 2, 3, 4, 5, 6, 7, 8, 9, 10, 11, 12, 13, 14, 15, 16, 17, 18, 19, 20, 21, 22, 23, 24 month(s) or year(s) or more after initial formation of the composition and/or after exposure to certain conditions, such as, but not limited to, real world outdoor conditions (e.g., in California, Arizona and/or Texas), sun exposure, heat exposure, and/or conditions in accordance with AATCC 169 Option 3. In some embodiments, improvements in photooxidation of an acrylic composition of the present invention compared to a comparative composition may be determined by comparing the tensile strength, break strength, and/or flexibility of the compositions. In some embodiments, photooxidation may be determined with an unpigmented acrylic composition of the present invention and/or an unpigmented comparative composition, e.g., by comparing the compositions and/or one or more properties thereof. Methods known to those of skill in the art including, but not limited to, FTIR, GCMS, surface techniques, microscopy, and/or molecular weight analysis may be used to determine and/or measure photo-oxidation.

At least two types of degradation may be found in an acrylic composition (e.g., an acrylic fabric) when used in outdoor applications. These forms of degradation can be related to the pigments used for coloration in the solution dyeing process and/or base polymer degradation. Pigment selection can be important to achieve the needed color fastness for outdoor textile end uses. Pigments are often selected and tested in several accelerated weathering test methods to indicate performance. Examples of these tests can include SAE J2527 (SAE J2527 "Performance Based Standard for Accelerated Exposure of Automotive Exterior Materials Using a Controlled Irradiance Xenon-Arc Apparatus" J2527_200402, Issued: 2004-02-11), which is a simulation of Florida weather, and AATCC 169 Option 3, which is representative of Arizona conditions. As one of skill in the art will recognize, after the selection of proper pigments, there are several steps which are needed to prepare the pigments prior to injection into the polymer stream and subsequent fiber formation to create long lasting outdoor products.

Polymer degradation can manifest itself in two ways: strength retention and discoloration. Strength retention can be measured after accelerated weathering or outdoor exposure using a common tensile test in both the machine and cross machine direction of the fabric structure. Even through an acrylic composition may lose some tensile strength after time, it is still far superior to other commonly used products made from olefins and/or polyester, which are different in chemical composition. In view of this superiority, often acrylics will last for 5 or more years outdoors in a variety of environments. However, some ecru acrylic fibers and/or fabrics may have more degradation compared to pigmented acrylics since pigmented packages are not incorporated into the polymer.

The second way that polymer degradation can be observed is in the discoloration of the composition. In hot and high UV conditions, an acrylic composition (e.g., fiber and/or fabric) may turn a shade of yellow to light brown as the composition is degraded. Test methods such as, e.g., AATCC 169 Option 3, can be used to observe and/or measure both strength retention and polymer discoloration.

When exposed to UV light in the 300 nm-400 nm range, the light (energy) can be absorbed by chromophores, which can create photochemical reactions in the polymer, resulting in functional groups and/or impurities in the acrylic composition (e.g., fiber and/or fabric). The degree of polymer degradation can depend on the environment the acrylic composition is exposed to. One common method of color change may happen as a carbon nitrogen triple bond is excited through irradiation of UV energy. "Color change" as used herein refers to a change in color of any kind, such as, e.g., in lightness, hue, and/or chroma. According to aspects of the present invention, in some embodiments, a hindered amine light stabilizer may function as a radical scavenger, e.g., using a cyclic regeneration of nitrile mechanism. A hindered amine light stabilizer may interact with a detrimental free radical and may not attract hydrogen present in the acrylonitrile polymer backbone. In some embodiments, a hindered amine light stabilizer may only interact with a detrimental free radical. Oxygen may react within the acrylonitrile polymer backbone to create hydrogen peroxides which may also degrade the acrylonitrile polymer chain. In some embodiments, a hindered amine light stabilizer may function to remove or attract hydrogen peroxide and/or precursors thereof.

Discoloration (e.g., yellowing or browning) of the acrylonitrile polymer may be due to a new chromophore being formed, optionally after a certain number double bonds are created in the polymer structure. Alternatively or in addition, discoloration and/or polymer degradation may be seen after chain scissoring within the acrylonitrile polymer. The degree of discoloration may be influenced by the comonomer optionally present in the acrylic composition. Comonomers such as, but not limited to, methacrylate, methyl methacrylate and vinyl acetate, contain ester(s) which can be prone to degradation. In some embodiments, an acrylonitrile polymer comprises one or more co-monomer(s) that contain an ester.

Any suitable method may be used to determine and/or measure the improved and/or positive effects of adding and/or incorporating a hindered amine light stabilizer into an acrylic composition of the present invention. In some embodiments, GC-MS and/or FTIR analysis may be used to confirm improved stability before and/or after weathering and/or after exposure to certain conditions. In some embodiments, an acrylic composition may be tested in accordance with AATCC 169 Option 3 for color change in light pigmented shades and/or unpigmented fibers. In some embodiments, tensile strength testing of an acrylic composition may be performed after exposure to conditions in accordance with AATCC Option 3 compared to a control composition exposed to the same conditions.

Figure 2:
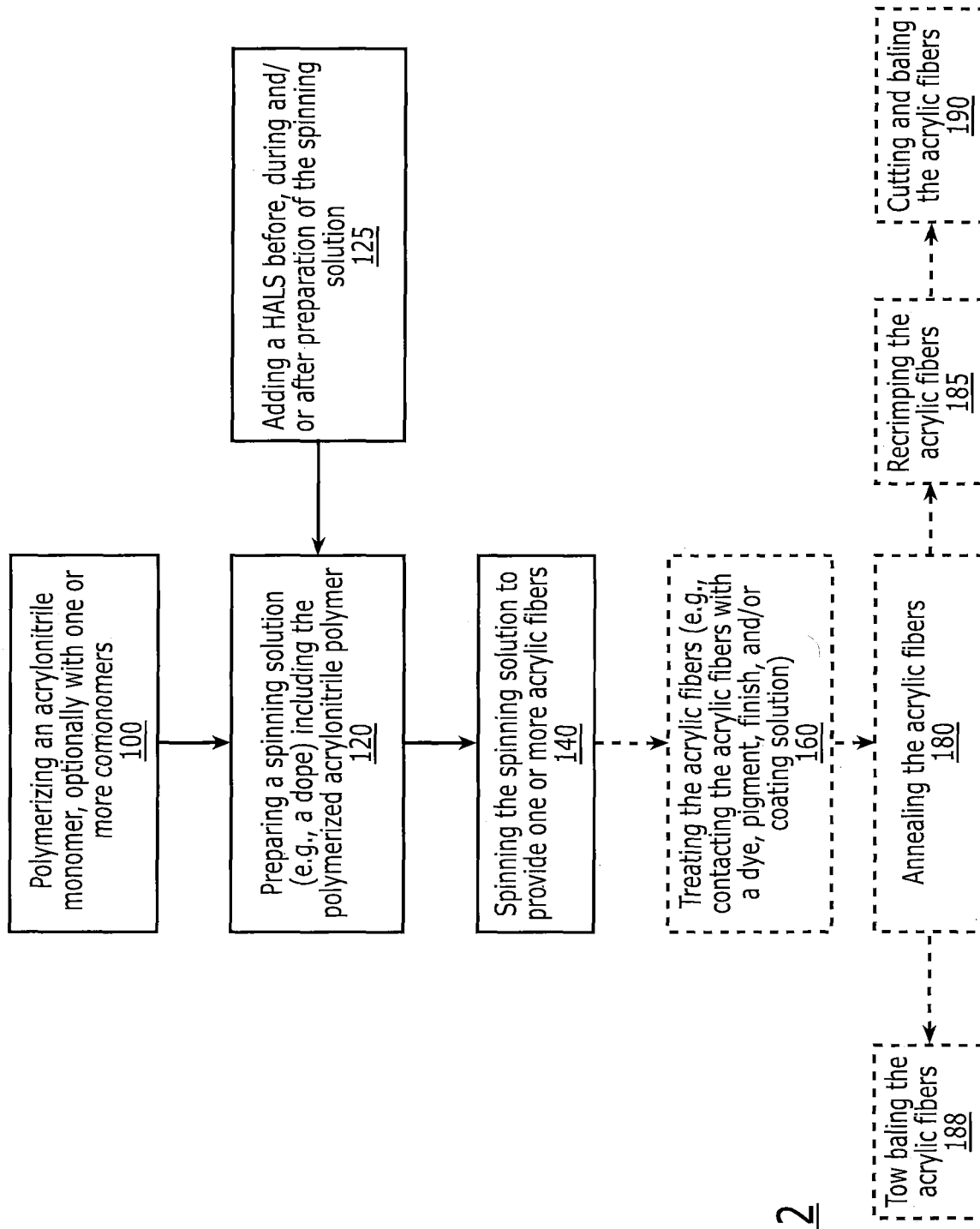
FIG. 2 is a schematic diagram overview of an acrylic process according to example embodiments of the present invention.

As one of ordinary skill in the art will recognize, acrylic fiber can be produced via several different production methods. Any suitable production method may be used in a method of the present invention. An overview of an example acrylic process is provided in FIG. 2. In general, a method for producing an acrylic fiber can be divided into the following steps: polymerization, production of a spinning solution, fiber spinning, and optional post-treatments. As shown in FIG. 2, a method of the present invention may comprise polymerizing (e.g., by free radical polymerization) an acrylonitrile monomer and optionally a comonomer (block 100). The comonomer may be used to provide specific physical properties of the acrylonitrile polymer. A spinning solution (e.g., a dope) may be prepared that includes the polymerized acrylonitrile polymer (block 120), and before, during, and/or after preparation of the spinning solution a hindered amine light stabilizer (HALS) may be added to the acrylonitrile polymer (block 125). In some embodiments, prior to fiber spinning, the acrylonitrile polymer may be solubilized into a dope using a suitable solvent and a HALS may be added to the dope. The spinning solution may then be spun (e.g., extruded) using a spinning process to provide one or more acrylic fiber(s) (block 140). As one of ordinary skill in the art will recognize a spinning process (e.g., a wet or dry spinning process) can involve passing the spinning solution through a spinneret to spin (e.g., extrude) an acrylic fiber. The acrylic fiber(s) may then be treated and/or go through one or more post-processing steps. In some embodiments, the acrylic fiber(s) may be treated (block 160), such as, e.g., contacting the acrylic fiber(s) with a dye, pigment, finish, and/or coating solution, optionally during the spinning step (block 140). The acrylic fiber(s) may be annealed (block 180). In some embodiments, the acrylic fibers may be tow baled (block 188). Alternatively, the acrylic fibers may be recrimped (block 185) and/or cut and baled (block 190).

"Dope" as used herein refers to a homogeneous solution comprising an acrylonitrile polymer (e.g., a polyacrylonitrile homopolymer and/or copolymer), one or more (e.g., 1, 2, 3, 4, or more) solvent(s), and optionally one or more (e.g., 1, 2, 3, 4, or more) additive(s). Example solvents that may be used in a dope include, but are not limited to, dimethylformamide, dimethylacetamide, and/or dimethyl sulfoxide. In some embodiments, the solvent is a polar organic solvent. In some embodiments, a dope may have a composition as provided in Table 2.

TABLE 2

Example dope compositions.

| Solvent present in the Dope | % Acrylonitrile Polymer in the Dope |
|---|---|
| Dimethylformamide | 28%-32% |
| Dimethylacetamide | 22%-27% |
| Aqueous Sodium thiocyanate | 10%-15% |
| Aqueous Zinc Chloride | 8%-12% |
| Dimethyl sulfoxide | 20%-25% |
| Nitric Acid | 8%-12% |

Figure 3:
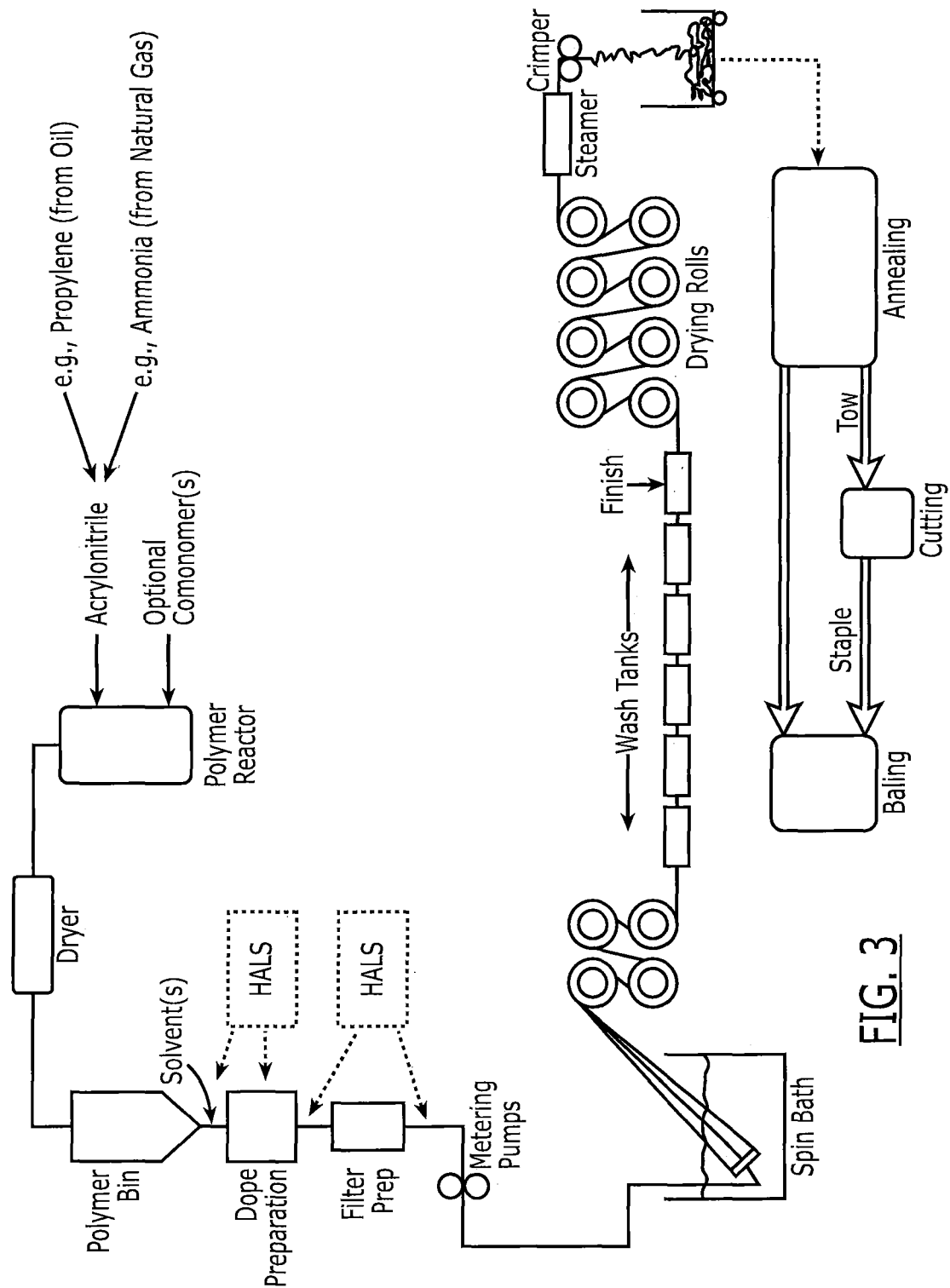
FIG. 3 is a schematic diagram of a wet spinning process according to example embodiments of the present invention.
Figure 4:
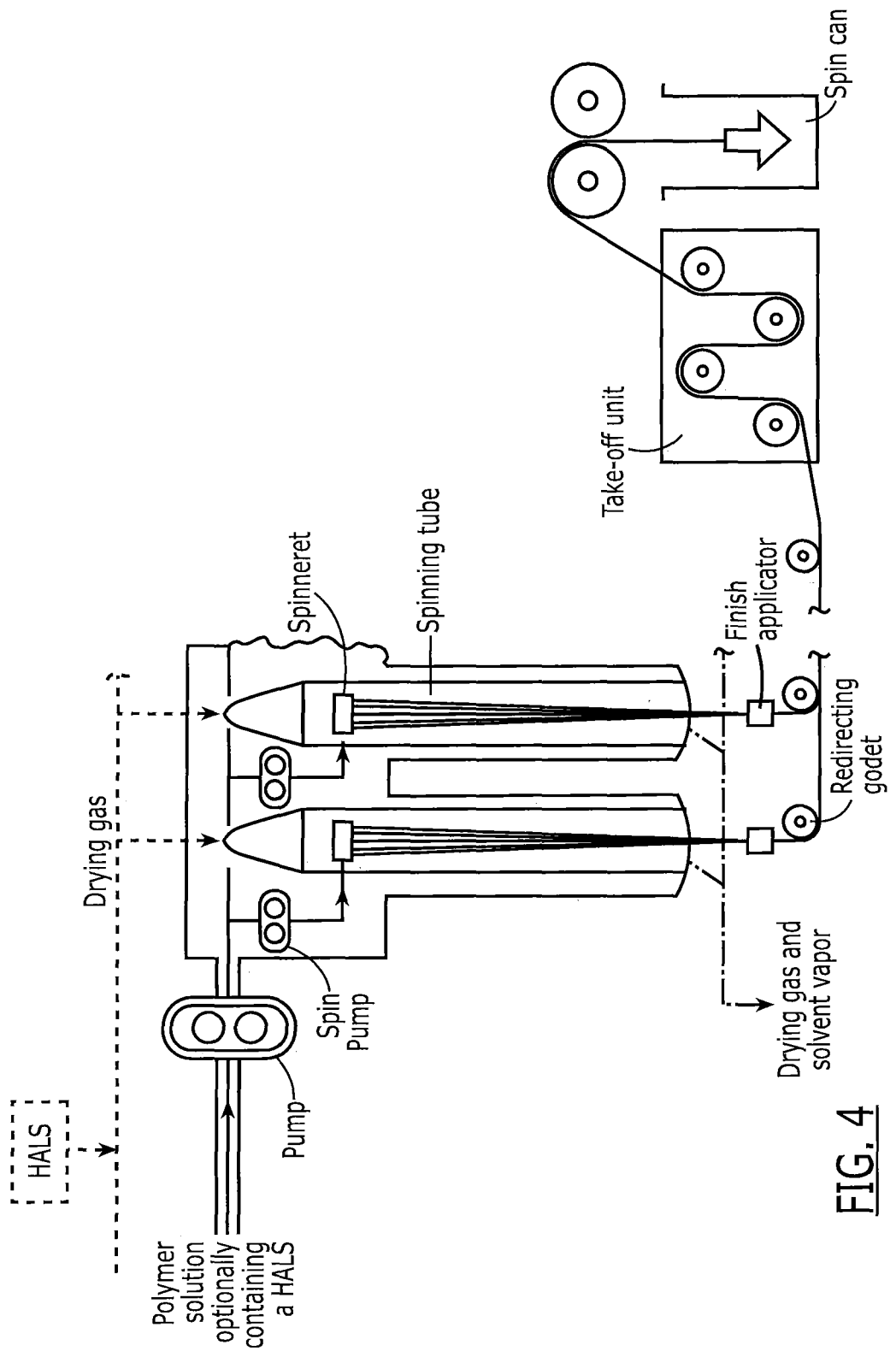
FIG. 4 is a schematic diagram of a dry spinning process according to example embodiments of the present invention.

Once the dope has been created, optionally one or more additive(s) and/or pigment(s) may be injected into the dope and/or a dope stream, and may be mixed prior to the fiber spinning process. A spinneret may be used to form an acrylic fiber as the dope (e.g., viscous dope) moves through one or more hole(s) of the spinneret. In the case of wet spinning, an acrylic fiber may begin to form in a coagulation bath, which may contain both water and a solvent (e.g., an organic solvent). Gelation of the acrylic fiber occurs as the solvent present in the acrylic fiber begins to move from the acrylic fiber. An example wet spinning process is shown in FIG. 3. In some embodiments, a hindered amine light stabilizer may be added during and/or after dope preparation and/or prior to the polymer solution reaching the metering pumps as shown in FIG. 3. In the case of dry spinning, fiber formation occurs through evaporation of the solvent present in the acrylic fiber as the dope exits the spinneret in a heated spinning tube. An example dry spinning process is shown in FIG. 4. In some embodiments, a hindered amine light stabilizer may be present in the polymer solution and/or added into the polymer solution prior to drying as shown in FIG. 4. Subsequent processes can involve washing, stretching and/or drying of a tow band under specific conditions to create the desired fiber properties for the end-use application. The resultant product may be, but is not limited to, cut staple fiber, tow, or multifilament yarn depending on the desired finished good.

In some embodiments, a method of the present invention may comprise one or more post-treatments. Any suitable post-treatment may be used in a method of the present invention. In some embodiments, an acrylic fiber is contacted with a finishing and/or coating treatment known to those of skill in the art, such as, e.g., contacted with a fluorinated compound and/or polymer.

According to some embodiments of the present invention, a method of preparing an acrylic fiber is provided, the method comprising: adding a hindered amine light stabilizer to an acrylonitrile polymer to provide a stabilized acrylic composition; and forming an acrylic fiber from the stabilized acrylic composition, thereby preparing the acrylic fiber. In some embodiments, forming the acrylic fiber from the stabilized acrylic composition comprises spinning, extruding, and/or the like the stabilized acrylic composition to form the acrylic fiber.

In some embodiments, a hindered amine light stabilizer may be selected based on basicity of the hindered amine light stabilizer (e.g., one with low basicity), migration of the hindered amine light stabilizer in an acrylic composition (e.g., one that provides low migration), durability of the hindered amine light stabilizer in an acrylic composition (e.g., one that provides high durability), and/or heat stability of the hindered amine light stabilizer in an acrylic composition (e.g., one that provides high and/or long term heat stability). As described herein, example hindered amine light stabilizers include, but are not limited to, Tinuvin® 622, Tinuvin® 123, Tinuvin® 111, Tinuvin® 371, Chimassorb® 2020, and/or Cyasorb® 3529.

In some embodiments, adding a hindered amine light stabilizer to the acrylonitrile polymer comprises adding the hindered amine light stabilizer prior to, during, and/or after a solubilization step and/or a fiber spinning step. Referring to FIG. 2, a hindered amine light stabilizer may be added after a polymerization step and prior to, during, and/or after dope preparation, and/or prior to and/or during fiber spinning. In some embodiments, a hindered amine light stabilizer is added to the acrylonitrile polymer prior to, during, and/or after a solubilization step, optionally with, at the same time as, or sequentially with one or more additive(s) and/or pigment(s). A pigment and/or additive may be added to an acrylonitrile polymer prior to, during and/or after the adding of the hindered amine light stabilizer to the acrylonitrile polymer. In some embodiments, a composition comprising a hindered amine light stabilizer and one or more additive(s) and/or pigment(s) is added to the acrylonitrile polymer. In some embodiments, a pigment and/or additive is separately added to the acrylonitrile polymer, optionally at the same time as a hindered amine light stabilizer.

In some embodiments, a hindered amine light stabilizer is added to an acrylonitrile polymer once a dope has been created, and may be injected into the dope and/or a dope stream optionally with one or more additive(s) and/or pigment(s). The dope containing the hindered amine light stabilizer may be mixed and then may go through a fiber spinning step. The method may comprise a wet spinning or dry spinning fiber manufacturing process.

One or more (e.g., 1, 2, 3, 4, 5, or more) hindered amine light stabilizer(s) as described herein may be added to the acrylonitrile polymer at any suitable concentration. In some embodiments, one or more hindered amine light stabilizer(s) may be added to the acrylonitrile polymer in any suitable form (e.g., dry form (e.g., a powder) and/or in liquid form (e.g., a solution)). In some embodiments, a hindered amine light stabilizer may be added to the acrylonitrile polymer at a concentration greater than or equal to the desired concentration for the hindered amine light stabilizer in the acrylic composition. For example, a hindered amine light stabilizer may be present in an acrylic fiber in an amount in a range from about 0.01% to about 10% by weight of an acrylic fiber.

In some embodiments, a hindered amine light stabilizer (HALS) may be added at a concentration in a range of about 0.01%, 1%, or 5% to about 10%, 20%, or 30% by weight of the acrylic composition (e.g., the acrylic fiber). In some embodiments, a hindered amine light stabilizer may be added at a concentration of about 0.01%, 0.05%, 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30% by weight of the acrylic composition (e.g., the acrylic fiber). In some embodiments, a hindered amine light stabilizer is added to a dope and/or solvent, e.g., at a concentration in a range of about 0.01%, 1%, or 5% to about 10%, 20%, or 30% by weight of the acrylic composition (e.g., the acrylic fiber). A hindered amine light stabilizer used in a method and/or acrylic composition of the present invention may be compatible with, dissolved in, and/or soluble in a dope and/or solvent used in a method of the present invention. The solvent may be and/or the dope may comprise a polar solvent.

In some embodiments, a hindered amine light stabilizer (e.g., in powder form) may be prepared in a manner similar to a pigment for a solution dyeing process. This may involve use of a dope solution and mixing system. Once premixing has occurred, the solution may be milled to a given particle size and/or evenness of the material. In some embodiments, an acrylonitrile polymer may be mixed with a solution comprising a hindered amine light stabilizer and optionally an additive and/or pigment, which may aid in dispersing the solution during injection. In some embodiments, a hindered amine light stabilizer may be added directly into a solution (e.g., a solvent) without the presence of an acrylonitrile polymer, and this may involve mixing to provide adequate solubility. In some embodiments, a solution comprising a hindered amine light stabilizer may be filtered and/or the viscosity of the solution may be determined. A solution comprising a hindered amine light stabilizer may be stored in a container or reservoir (e.g., a tote), optionally with a circulation system or proper mixing apparatus.

A method of the present invention may further comprise forming a yarn, thread, and/or fabric from the acrylic fiber. Any suitable method for forming the yarn, thread, and/or fabric from the acrylic fiber may be used. In some embodiments, a method of the present invention comprises weaving an acrylic fiber and/or yarn into an acrylic fabric. Any suitable weave may be used, including, but not limited to, a plain weave, twill weave, leno weave, dobby weave, jacquard weave, and/or satin weave.

A method of the present invention may provide and/or produce an acrylic fiber and/or fabric comprising the same having one more improved properties, such as, but not limited to, those described herein (e.g., reduced polymer degradation and/or reduced discoloration) compared to a comparative fiber and/or fabric comprising the comparative fiber. In some embodiments, a method of the present invention may produce an acrylic fiber and/or fabric for outdoor end use and/or that is suitable for outdoor use, optionally wherein the acrylic fiber and/or fabric has improved properties, such as, e.g., reduced polymer degradation and/or reduced discoloration.

In some embodiments, a hindered amine light stabilizer is added to an acrylonitrile polymer after polymerization of the acrylonitrile polymer and prior to fiber spinning. The hindered amine light stabilizer may be added (e.g., injected) into a dope (e.g., at a concentration of about 0.01% to about 30% by weight of the dope), optionally in a manner similar to a pigment (e.g., by using a metering pump) to provide a stabilized acrylic composition. The hindered amine light stabilizer may be in a solution, such as, e.g., a solution comprising a solvent and the hindered amine light stabilizer. In some embodiments, the hindered amine light stabilizer is added to a portion of a dope, which may then be added to the remaining portion of the dope and/or a dope fiber stream. After being added to (e.g., injected into) the dope and/or a dope fiber stream, the stabilized acrylic composition may be mixed (e.g., with a long mixing screw), which may disperse the hindered amine light stabilizer within the stabilized acrylic composition prior to spinning. The stabilized acrylic composition may then be extruded (e.g., through a spinneret) and phase separated into a gel in a wet spinning bath (i.e., a coagulation bath) comprising water and solvent (e.g., in a given ratio). Better fine fiber structures may be provided in a coagulation bath with a higher solvent to water ratio and reduced temperatures. These properties can slow the phase change as the fiber is being formed. An example coagulation bath may comprise about 60% DMAc and about 40% water and may be at a temperature of about 45° C. with a spin dope temperature of less than 120° C. In some embodiments, a spinneret may have about 10,000 to about 60,000 holes. Fiber spinning may likely occur at about 3 meters/min to about 10 meters/min.

In some embodiments, addition of a hindered amine light stabilizer may be completed prior to injection into a dope stream. The hindered amine light stabilizer may be diluted in a solvent, which may aid in providing a constant and/or consistent feeding through a metering pump. Dispersion and/or runnability issues may occur if the concentration of the hindered amine light stabilizer is too high and/or viscous. These issues may manifest as clogging of the spinneret holes.

Figure 5A:
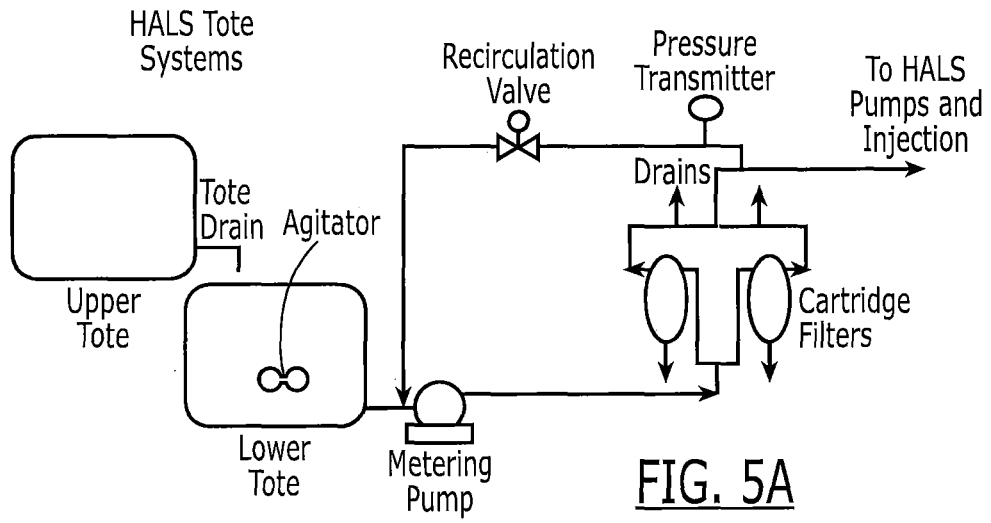
FIG. 5A is a schematic diagram of part of a system for adding a hindered amine light stabilizer to an acrylonitrile polymer showing a schematic of a tote or master line used to contain and/or transport a hindered amine light stabilizer according to example embodiments of the present invention.
Figure 5B:
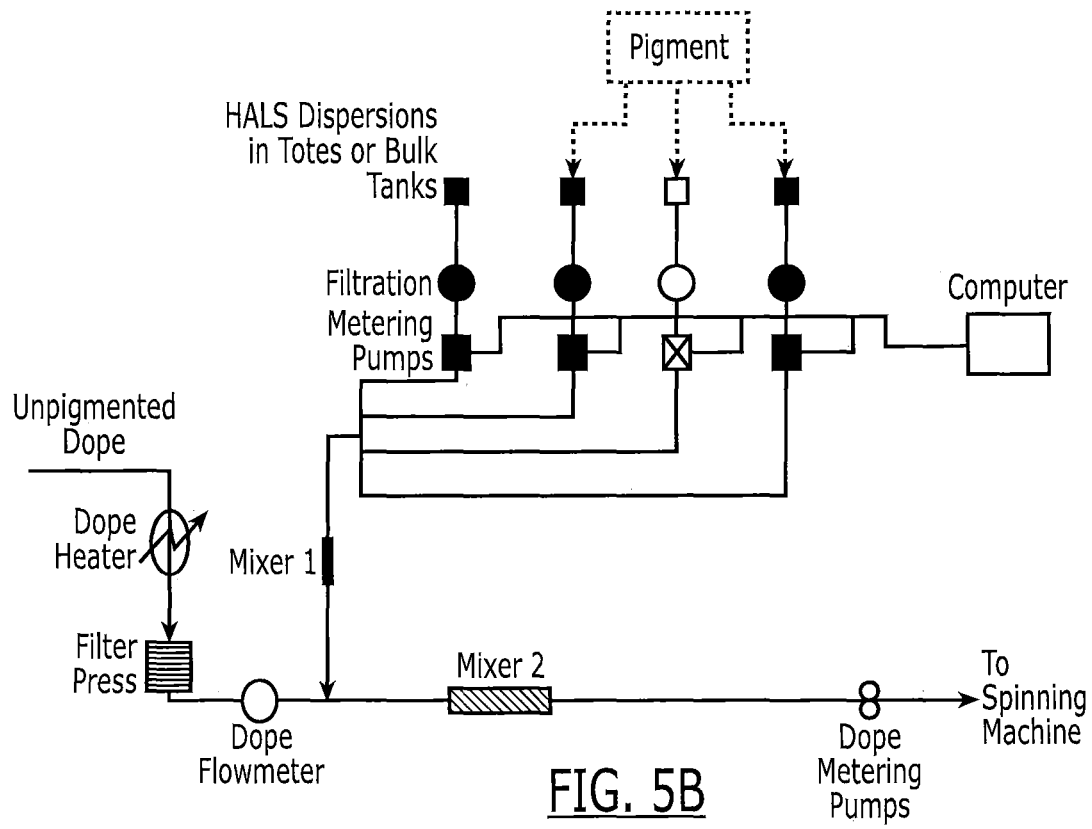
FIG. 5B is a schematic diagram of part of a system that may be used with the system of FIG. 5A to add a hindered amine light stabilizer to an acrylonitrile polymer according to example embodiments of the present invention.

Referring now to FIGS. 5A and 5B, a hindered amine light stabilizer may be added to an acrylonitrile polymer to provide a stabilized acrylic composition prior to fiber spinning via injection in a solution dyeing process (similar to pigment addition). As shown in FIG. 5A, a tote or master line can transport a hindered amine light stabilizer (e.g., a solution containing the hindered amine light stabilizer) to the injection site prior to a mixing screw. As shown in FIG. 5B, the hindered amine light stabilizer and optionally one or more pigments may then be dosed into the polymer stream from the tote or master line, then mixed and filtered for consistency. In some embodiments, the hindered amine light stabilizer may be selectively added to given batches of an acrylonitrile polymer.

Figure 6:
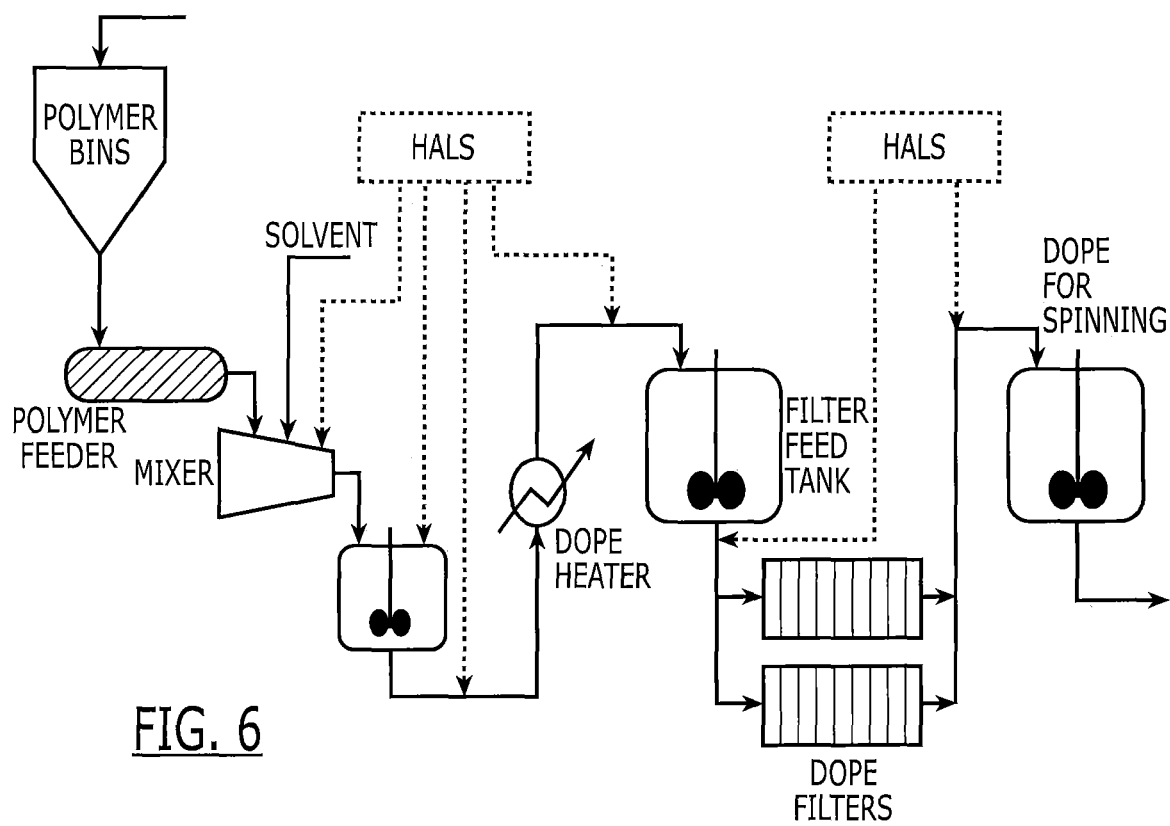
FIG. 6 is a schematic diagram of a system for adding a hindered amine light stabilizer to an acrylonitrile polymer during preparation of a dope according to example embodiments of the present invention.

Referring now to FIG. 6, prior to and/or during fiber spinning, a hindered amine light stabilizer may be added to an acrylonitrile polymer at one or more steps in a process of preparing a dope to provide a stabilized acrylic composition. In some embodiments, the HALS may be added to the acrylonitrile polymer at the same time as the solvent and/or may be present in the solvent. In some embodiments, the HALS may be added to the acrylonitrile polymer after the solvent is added, such as, e.g., during mixing of the dope and/or prior to, during, and/or after heating and/or filtering of the dope. In some embodiments, the HALS may be added to the dope prior to and/or during fiber spinning. The dope may comprise the polymer, one or more solvent(s), and optionally one or more additive(s) (e.g., antioxidant(s)) and/or pigment(s)).

The present invention is explained in greater detail in the following non-limiting examples.

EXAMPLES

Example 1

Strength retention and color stability were studied in several trials at lab scale and production scale using specific HALS formulations of Tinuvin® 123 (i.e., Additive 2) or Tinuvin® 622 (i.e., Additive 1) with ecru or pigmented fibers. An acrylonitrile polymer was prepared having a composition comprising 94% of poly(acrylonitrile-co-vinyl acetate), 5.9% of vinyl acetate, and 0.1% sodium styrene sulfonate. Subsequently, 0% to about 1.5% of a HALS additive and 0% to about 2% of a pigment, each by weight of the acrylic fiber (i.e., on weight of the fiber), were added to the dope stream comprising the acrylonitrile polymer (similar to the process as shown in FIG. 5B) and a wet spinning process was used to provide the acrylic fibers. The acrylic fiber was a 2 denier fiber with a 45 mm staple length. The acrylic fibers were prepared into a 18/2 ring spun cotton count with 12.25 turns per inch in the singles yarn and 12.4 turns per inch the ply.

These results demonstrated an improvement in performance for the samples with a HALS when tested according to AATCC 169 Option 3 with the parameters shown in Table 3. The AATCC 169 Option 3 method is of interest as this method yields conditions that are expected to manifest the degradation of the acrylic material. This xenon arc method uses a borosilicate/borosilicate filter with 0.35 W/m2 irradiance at 340 nm, 77° C. black panel temperature with continuous light exposure. Measurements for either tensile strength or color changes are done at increments of 880, 1,320, 2,200 kJs of UV exposure.

TABLE 3

Parameters used for AATCC 169 Option 3 (i.e., AATCC 169-3).

| | AATCC 169 Option 3 | |
|---|---|---|
| Wavelength (Measured) | 340 | nm |
| Irradiance (Measured) | 0.35 | W/m2 |
| Lamp Type | Xenon Arc | |
| Filter System (outer/inner) | Borosilicate/Borosilicate | |
| nm exposure limits | 200-800 nm | |
| Black Panel | 77 +/− 3 | C. |
| Conditioning Water Temp | 40 | C. |
| Wet bulb depression | ~20 | C. |
| Wet bulb | ~35 | C. |
| Dry bulb | ~55 | C. |
| Humidity | 27 +/− 3% RH | |
| water spray | none | |
| Light cycle length | continuous | |
| Dark cycle length | none | |
| Exposure and observation cycles | observations made at 880 kJ, 1320 kJ and 2200 kJ (0.79 kJ/hr) | |

For strength retention testing, a 18/2 ring spun acrylic yarn was wrapped in one layer thickness around a 5.5" polystyrene plaque. After each xenon arc increment was completed, a 10" yarn sample was tested on an Instron tensile tester for grams/force breaking strength and elongation. A 10" sample was chosen to ensure at least half of the measured sample was exposed in the xenon arc test. This process was completed with 10 replicate breaks and then averaged to obtain the result.

In the case of color change evaluations, a knitted sock was created and mounted to the same 5.5" polystyrene card, but a paper mask with perforated tabs was placed over the samples. The perforated sections can be removed to expose the sample to different increments in the test method. Once the desired increments were completed, samples were evaluated using a spectrophotometer or rated per AATCC gray scale for color change.

Base polymer yellowing evaluations were completed in accordance with AATCC 169 Option 3 for ecru and pigmented fibers. In each case, improvements were clearly seen for fibers including a HALS compared to those without. After 2,200 kJ exposure in AATCC 169 Option 3, the samples containing a HALS showed significant improvement in base polymer stability of the fiber compared to those that did not contain a HALS (i.e., control fibers that were not doped with a HALS). It can be noted that ecru fiber incurred a larger color change and strength degradation than pigmented fiber. While not wishing to be bound to any particular theory, this is believed to be due to stabilization and absorption properties of the pigments used in pigmented fiber that are absent in ecru fiber.

Figure 7:
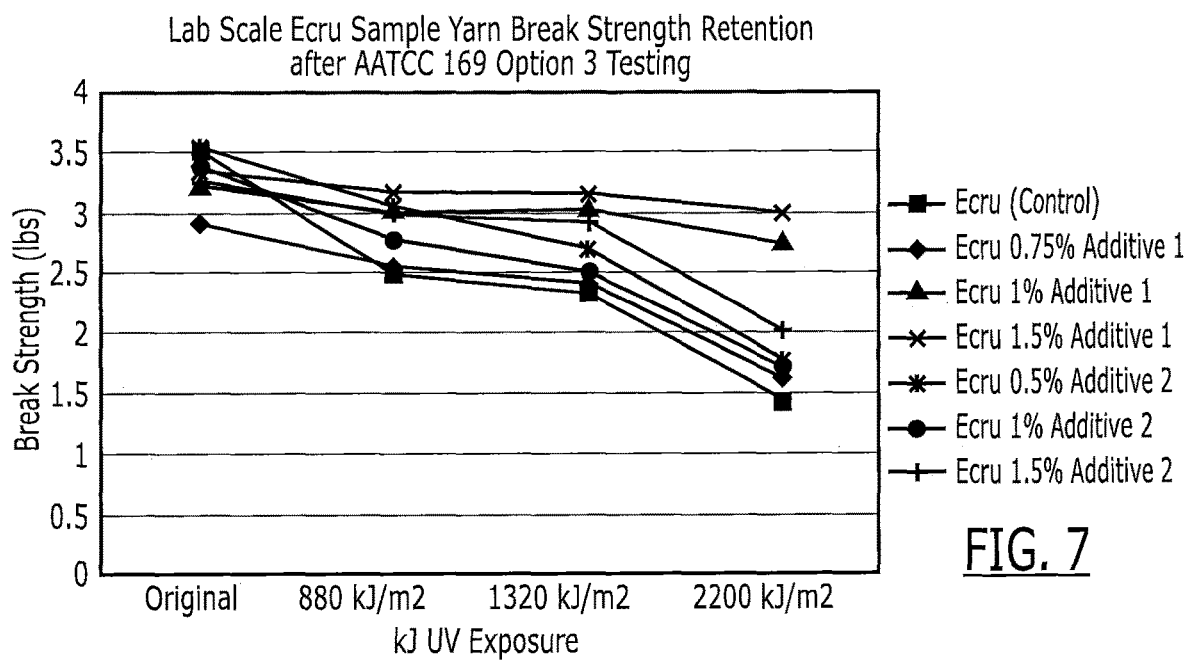
FIG. 7 is a graph showing lab scale ecru sample yarn break strength retention after AATCC 169 Option 3 testing.
Figure 8:
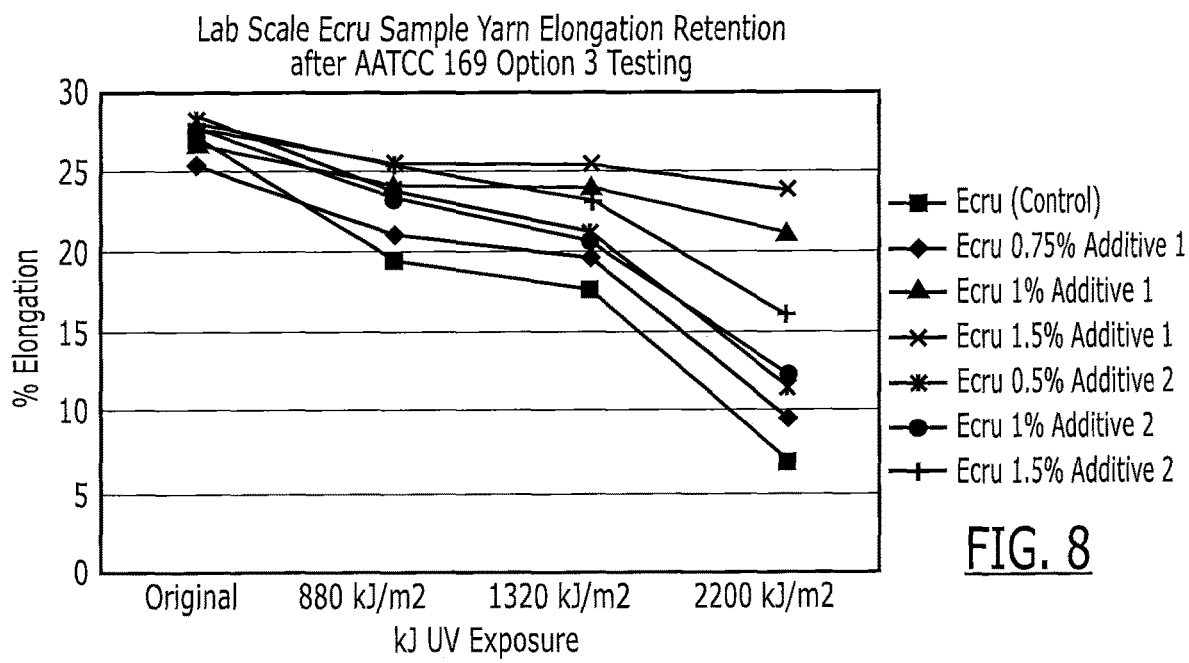
FIG. 8 is a graph showing lab scale ecru sample yarn elongation retention after AATCC 169 Option 3 testing.
Figure 9:
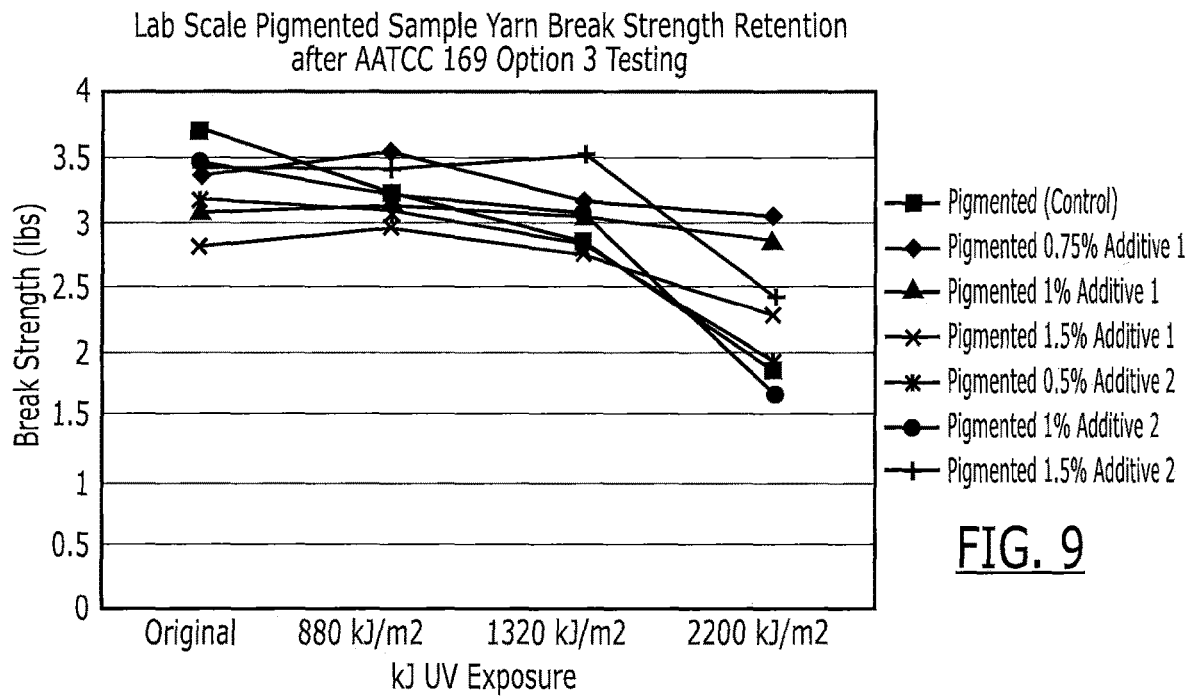
FIG. 9 is a graph showing lab scale pigmented sample yarn break strength retention after AATCC 169 Option 3 testing.
Figure 10:
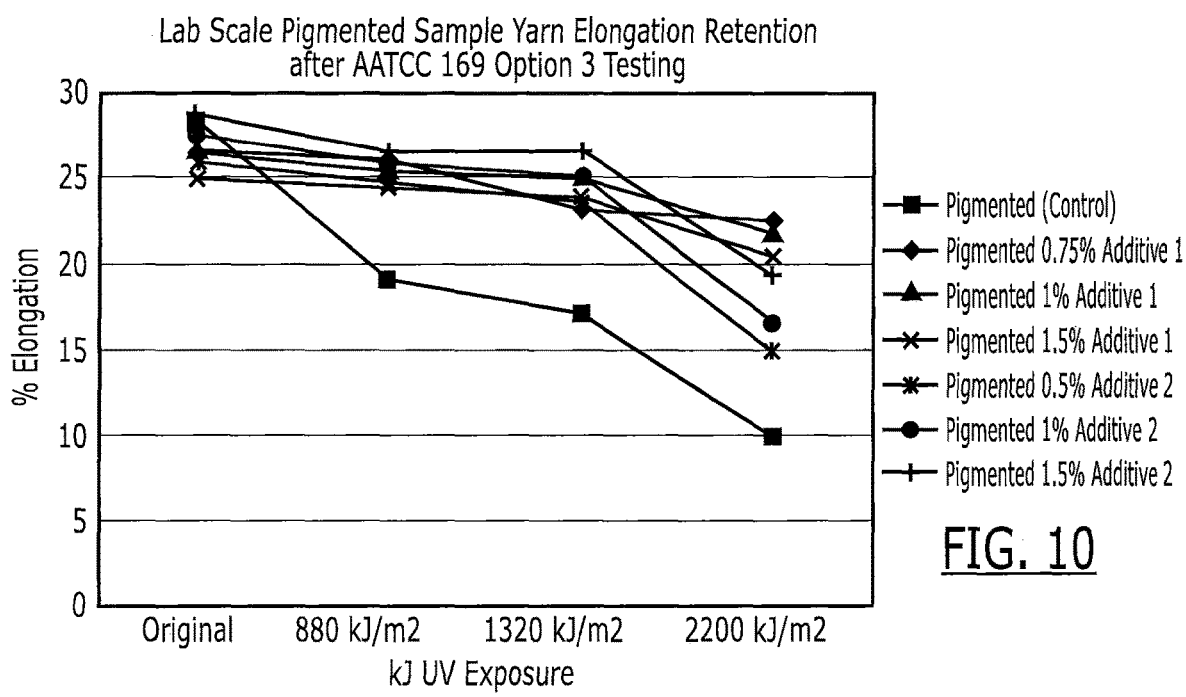
FIG. 10 is a graph showing lab scale pigmented sample yarn elongation retention after AATCC 169 Option 3 testing.

Lab Scale Results:

Table 4 provides the results for the yarn strength retention after testing the samples (i.e., control and HALS samples) after exposure to xenon arc according to AATCC 169-3. FIG. 7 is a graph of ecru sample yarn break strength retention after AATCC 169 Option 3 testing, and FIG. 8 is a graph of ecru sample yarn elongation retention after AATCC 169 Option 3 testing. FIG. 9 is a graph of lab scale pigmented sample yarn break strength retention after AATCC 169 Option 3 testing, and FIG. 10 is a graph of lab scale pigmented sample yarn elongation retention after AATCC 169 Option 3 testing.

TABLE 4

Lab Scale AATCC 169-3 (WOM) Yarn Strength Retention.

| | Original | 880 kJ/m² | 1320 kJ/m² | 2200 kJ/m² |
|---|---|---|---|---|
| Ecru (Control) | | | | |
| Break Strength (lbs) | 3.517 | 2.506 | 2.349 | 1.423 |
| Elongation (%) | 27.12 | 19.35 | 17.65 | 6.791 |
| Ecru 0.75% Additive 1 | | | | |
| Break Strength (lbs) | 2.92 | 2.564 | 2.416 | 1.62 |
| Elongation (%) | 25.39 | 20.98 | 19.63 | 9.52 |
| Ecru 1% Additive 1 | | | | |
| Break Strength (lbs) | 3.235 | 3.024 | 3.038 | 2.749 |
| Elongation (%) | 26.7 | 24.08 | 24.01 | 21.13 |
| Ecru 1.5% Additive 1 | | | | |
| Break Strength (lbs) | 3.349 | 3.168 | 3.159 | 2.996 |
| Elongation (%) | 26.86 | 25.41 | 25.35 | 23.77 |
| Ecru 0.75% Additive 2 | | | | |
| Break Strength (lbs) | 3.547 | 3.047 | 2.703 | 1.761 |
| Elongation (%) | 28.15 | 23.52 | 21.05 | 11.56 |
| Ecru 1% Additive 2 | | | | |
| Break Strength (lbs) | 3.386 | 2.783 | 2.519 | 1.718 |
| Elongation (%) | 27.63 | 23.22 | 20.73 | 12.2 |
| Ecru 1.5% Additive 2 | | | | |
| Break Strength (lbs) | 3.252 | 3.007 | 2.94 | 2.024 |
| Elongation (%) | 27.48 | 25.44 | 23.14 | 16.03 |
| Pigmented 0.75% Additive 1 | | | | |
| Break Strength (lbs) | 3.349 | 3.528 | 3.15 | 3.039 |
| Elongation (%) | 26.47 | 26.03 | 23.19 | 22.49 |
| Pigmented 1% Additive 1 | | | | |
| Break Strength (lbs) | 3.084 | 3.13 | 3.05 | 2.857 |
| Elongation (%) | 26.44 | 25.46 | 24.97 | 21.95 |
| Pigmented 1.5% Additive 1 | | | | |
| Break Strength (lbs) | 2.812 | 2.953 | 2.765 | 2.271 |
| Elongation (%) | 24.87 | 24.44 | 23.78 | 20.36 |
| Pigmented 0.75% Additive 2 | | | | |
| Break Strength (lbs) | 3.171 | 3.06 | 2.797 | 1.911 |
| Elongation (%) | 25.96 | 24.56 | 23.47 | 14.89 |
| Pigmented 1% Additive 2 | | | | |
| Break Strength (lbs) | 3.44 | 3.205 | 3.044 | 1.664 |
| Elongation (%) | 27.49 | 25.69 | 25.04 | 16.54 |
| Pigmented 1.5% Additive 2 | | | | |
| Break Strength (lbs) | 3.443 | 3.399 | 3.522 | 2.421 |
| Elongation (%) | 28.5 | 26.45 | 26.54 | 19.38 |
| Pigmented (Control) | | | | |
| Break Strength (lbs) | 3.695 | 3.216 | 2.829 | 1.847 |
| Elongation (%) | 28.26 | 19.15 | 17.08 | 9.89 |

Figure 11:
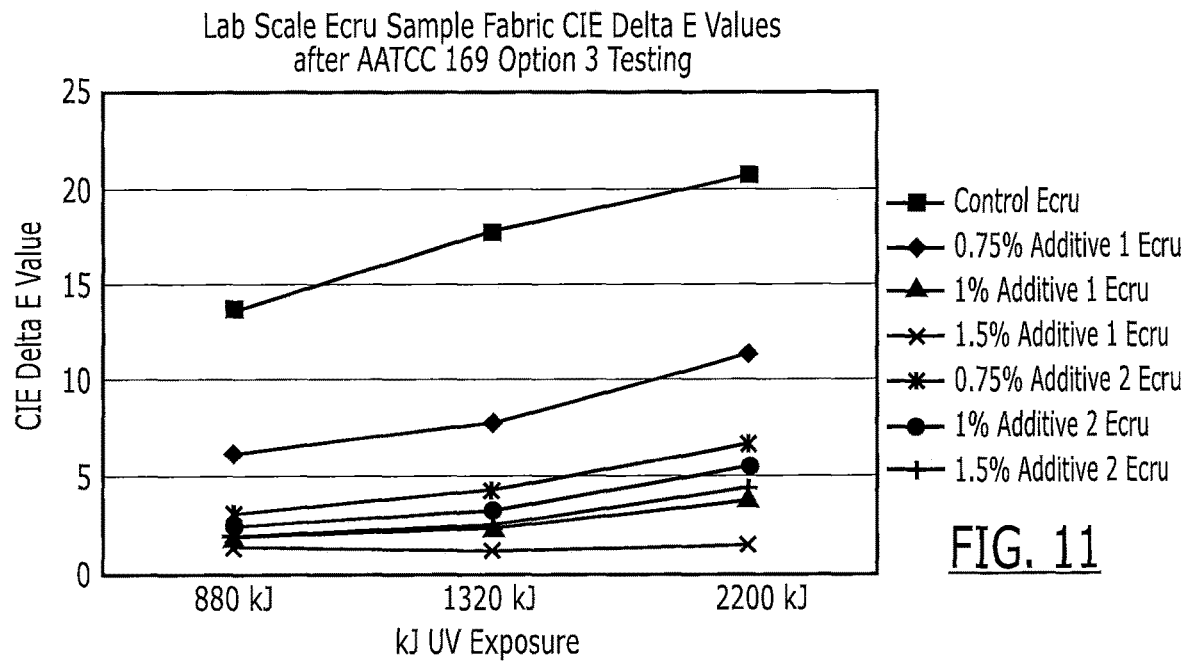
FIG. 11 is a graph showing the lab scale ecru sample fabric CIE Delta E values after AATCC 169 Option 3 testing.
Figure 12:
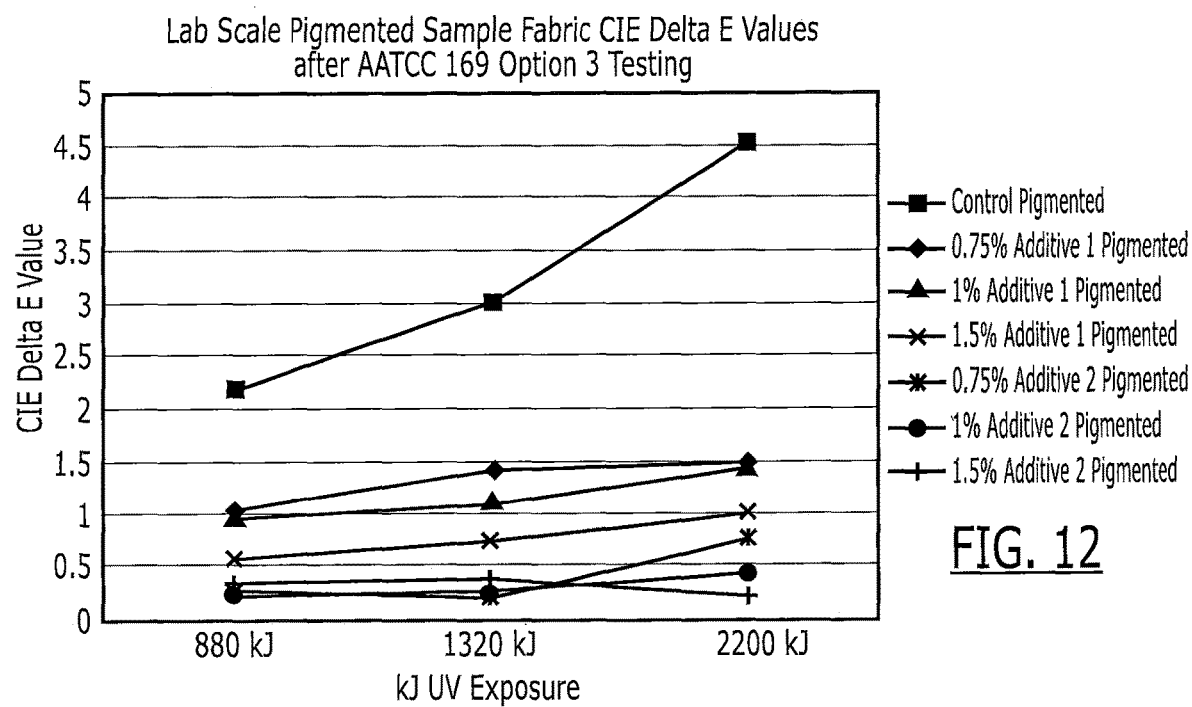
FIG. 12 a graph showing the lab scale pigmented sample fabric CIE Delta E values after AATCC 169 Option 3 testing.

Table 5 shows the CIE Delta E values for ecru knitted sock samples after testing according to AATCC 169-3, and Table 6 shows the CIE Delta E values for pigmented knitted sock samples after testing according to AATCC 169-3. The spectrophotometric measurements were made using a Datacolor 650 with a Daylight source. FIG. 11 is a graph of the lab scale ecru sample fabric CIE Delta E values after AATCC 169 Option 3 testing, and FIG. 12 a graph of the lab scale pigmented sample fabric CIE Delta E values after AATCC 169 Option 3 testing.

TABLE 5

Lab scale CIE Delta E values for ecru samples after AATCC 169-3 testing.

| Sample | 880 kJ | 1320 kJ | 2200 kJ |
|---|---|---|---|
| Control Ecru | 13.64 | 17.72 | 20.69 |
| 0.75% Additive 1 Ecru | 6.11 | 7.75 | 11.3 |
| 1% Additive 1 Ecru | 1.82 | 2.37 | 3.79 |
| 1.5% Additive 1 Ecru | 1.3 | 1.1 | 1.36 |
| 0.75% Additive 2 Ecru | 2.98 | 4.22 | 6.57 |
| 1% Additive 2 Ecru | 2.39 | 3.2 | 5.45 |
| 1.5% Additive 2 Ecru | 1.74 | 2.27 | 4.25 |

TABLE 6

Lab scale CIE Delta E values for pigmented samples after AATCC 169-3 testing.

| Sample | 880 kJ | 1320 kJ | 2200 kJ |
|---|---|---|---|
| Control Pigmented | 2.18 | 3 | 4.54 |
| 0.75% Additive 1 Pigmented | 1.02 | 1.41 | 1.46 |
| 1% Additive 1 Pigmented | 0.95 | 1.12 | 1.45 |
| 1.5% Additive 1 Pigmented | 0.57 | 0.74 | 1.01 |
| 0.75% Additive 2 Pigmented | 0.27 | 0.21 | 0.73 |
| 1% Additive 2 Pigmented | 0.22 | 0.24 | 0.42 |
| 1.5% Additive 2 Pigmented | 0.31 | 0.36 | 0.21 |

Figure 13:
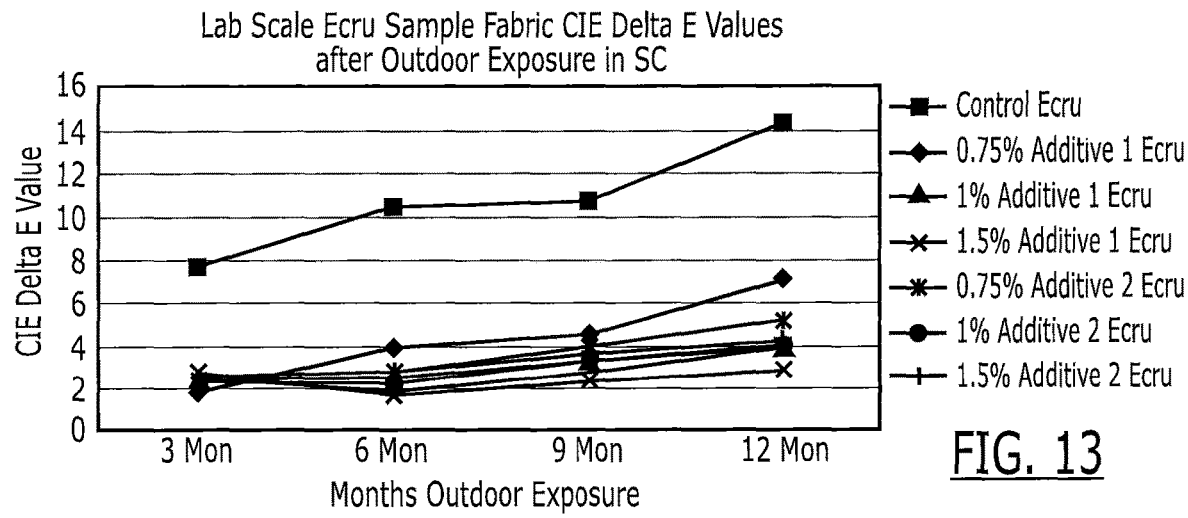
FIG. 13 is a graph showing the lab scale ecru sample fabric CIE Delta E values after outdoor exposure in South Carolina.

Table 7 shows the CIE Delta E values for ecru knitted sock samples after real world weathering by outdoor exposure in South Carolina, and Table 8 shows the CIE Delta E values for pigmented knitted sock samples after real world weathering by outdoor exposure in South Carolina. The spectrophotometric measurements were made using a Datacolor 650 with a Daylight source. Specimens were mounted at a 45-degree angle using an Atlas weathering rack facing due south in South Carolina. FIG. 13 is a graph of the lab scale ecru sample fabric CIE Delta E values after outdoor exposure in South Carolina.

TABLE 7

Lab scale ecru sample fabric CIE Delta E values after outdoor exposure in South Carolina.

| Sample | 3 Mon | 6 Mon | 9 Mon | 12 Mon |
|---|---|---|---|---|
| Control Ecru | 7.66 | 10.48 | 10.68 | 14.31 |
| 0.75% Additive 1 Ecru | 1.8 | 3.9 | 4.5 | 7.07 |
| 1% Additive 1 Ecru | 2.24 | 1.62 | 2.6 | 3.66 |
| 1.5% Additive 1 Ecru | 2.69 | 1.64 | 2.3 | 2.8 |
| 0.75% Additive 2 Ecru | 2.38 | 2.78 | 3.92 | 5.16 |
| 1% Additive 2 Ecru | 2.36 | 2.14 | 3.29 | 3.83 |
| 1.5% Additive 2 Ecru | 2.35 | 2.78 | 3.57 | 4.15 |

TABLE 8

Lab scale pigmented sample fabric CIE Delta E values after outdoor exposure in South Carolina.

| Sample | 3 Mon | 6 Mon | 9 Mon | 12 Mon |
|---|---|---|---|---|
| Control Pigmented | 0.9 | 1.43 | 0.99 | 1.73 |
| 0.75% Additive 1 Pigmented | 1.11 | 1.65 | 1.55 | 1.94 |
| 1% Additive 1 Pigmented | 1.01 | 1.58 | 1.41 | 1.93 |
| 1.5% Additive 1 Pigmented | 0.92 | 1.37 | 1.32 | 1.6 |
| 0.75% Additive 2 Pigmented | 0.63 | 0.66 | 0.74 | 0.72 |
| 1% Additive 2 Pigmented | 0.87 | 0.7 | 0.91 | 0.99 |
| 1.5% Additive 2 Pigmented | 0.69 | 0.64 | 0.98 | 0.72 |

Figure 14:
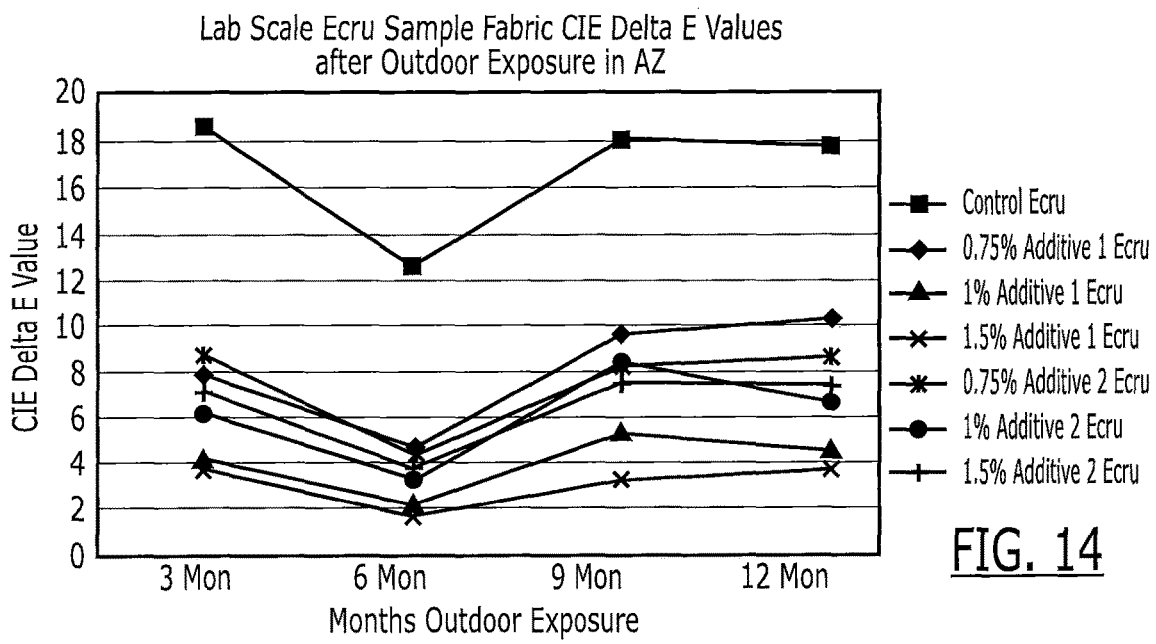
FIG. 14 is a graph showing the lab scale ecru sample fabric CIE Delta E values after outdoor exposure in Arizona.

Table 9 shows the CIE Delta E values for ecru knitted sock samples after real world weathering by outdoor exposure in Arizona, and Table 10 shows the CIE Delta E values for pigmented knitted sock samples after real world weathering by outdoor exposure in Arizona. The spectrophotometric measurements were made using a Datacolor 650 with a Daylight source. Specimens were mounted at a 45-degree angle using an Atlas weathering rack facing due south in Arizona. FIG. 14 is a graph of the lab scale ecru sample fabric CIE Delta E values after outdoor exposure in Arizona. As can be seen, e.g., in Table 9, a cycle of base polymer discoloration can be observed in acrylic products in hot and high UV areas where discoloration can increase over time (e.g., at time point 1), then exhibit a reduction (e.g., at time point 2, which has a lower CIE Delta E value than at time point 1), only to increase again (e.g., at time point 3, which has a higher CIE Delta E value than at time point 2). While not wishing to be bound to any particular theory, this phenomenon may be due to a reduction in acrylonitrile polymer molecular weight reduction, e.g., as areas of newly formed double bonds are altered and/or some chromophores are broken.

TABLE 9

Lab scale ecru sample fabric CIE Delta E values after outdoor exposure in Arizona.

| Sample | 3 Mon | 6 Mon | 9 Mon | 12 Mon |
|---|---|---|---|---|
| Control Ecru | 18.68 | 12.61 | 18.11 | 17.84 |
| 0.75% Additive 1 Ecru | 7.86 | 4.61 | 9.61 | 10.25 |
| 1% Additive 1 Ecru | 4.09 | 2.13 | 5.24 | 4.53 |
| 1.5% Additive 1 Ecru | 3.72 | 1.61 | 3.17 | 3.73 |
| 0.75% Additive 2 Ecru | 8.63 | 4.27 | 8.21 | 8.6 |
| 1% Additive 2 Ecru | 6.22 | 3.18 | 8.43 | 6.62 |
| 1.5% Additive 2 Ecru | 7.14 | 3.64 | 7.49 | 7.36 |

TABLE 10

Lab scale pigmented sample fabric CIE Delta E values after outdoor exposure in Arizona.

| Sample | 3 Mon | 6 Mon | 9 Mon | 12 Mon |
|---|---|---|---|---|
| Control Pigmented | 1.79 | 0.48 | 1.89 | 1.91 |
| 0.75% Additive 1 Pigmented | 0.89 | 0.88 | 1.14 | 1.53 |
| 1% Additive 1 Pigmented | 0.79 | 0.94 | 1.07 | 1.17 |
| 1.5% Additive 1 Pigmented | 0.65 | 0.74 | 0.75 | 0.92 |
| 0.75% Additive 2 Pigmented | 0.87 | 0.51 | 0.57 | 0.75 |
| 1% Additive 2 Pigmented | 1 | 0.54 | 1.23 | 0.73 |
| 1.5% Additive 2 Pigmented | 0.48 | 0.51 | 0.93 | 0.4 |

Production Scale:

For the production scale testing, a 2.2 dtex x 48 mm acrylic staple fiber was made by wet spinning PAN using dimethylacetamide and 1% of each additive. Target properties of key importance include dtex, tensile strength, and elongation. Table 11 reflects ecru production data as measured using a Textechno Fafegraph HR+Textechno Vibromat ME with the test in accordance with EN ISO 5079.

TABLE 11

Ecru staple fiber production data.

|  | Limits | Fiber with Additive 1 | Fiber with Additive 2 |
|---|---|---|---|
| Dtex | 1.95-2.45 | 2.4 | 1.99 |
| Tenacity (cN/TEX) | 30 minimum | 41 | 38 |
| Elongation (%) | 25-40 | 36 | 31 |

Fiber made using Additive 1 or Additive 2 was ring spun into 18/2 cotton count yarn. Again, key measurements include yarn strength and elongation properties, which were measured using an Uster Tensojet. Data was recorded at three different audit times (e.g., beginning, middle, and end) in the yarn spinning merge for both Additive 1 and Additive 2 (Table 12).

TABLE 12

Production scale yarn strength and yarn elongation.

|  | Yarn Strength (cN/TEX) | Yarn Elongation % |
|---|---|---|
| Ecru Control | 27.92 | 20.94 |
| Additive 1- Sample A | 27.50 | 21.68 |
| Additive 1- Sample B | 28.09 | 21.72 |
| Additive 1- Sample C | 27.40 | 21.89 |
| Additive 2- Sample A | 27.60 | 21.76 |
| Additive 2- Sample B | 27.51 | 21.99 |
| Additive 2- Sample C | 27.78 | 22.03 |

The yarns were then woven into two different common textile constructions for evaluation in fabric. All values achieved were acceptable for commercial textiles. Each textile was finished with a fluorocarbon-based water and oil repellent.

TABLE 13

Plain weave 100% acrylic fabric with 75 ends × 35 picks.

|  | Control | Additive 1 | Additive 2 |
|---|---|---|---|
| ASTM D3776-96: Weight (ounces per square yard) | 8.7 | 8.8 | 8.6 |
| ASTM D5034-95: Break lbs. (machine direction) | 320 | 326 | 331 |
| ASTM D5034-95: Break lbs. (cross direction) | 199 | 213 | 199 |
| ASTM D2261-96: Tear lbs. (machine direction) | 17 | 18 | 18 |
| ASTM D2261-96: Tear lbs. (cross direction) | 13 | 13 | 13 |
| AATCC 22-2001: Spray water resistance | 100 | 100 | 100 |
| AATCC118-1997: Oil resistance | 6 | 6 | 6 |

TABLE 14

Plain weave 100% acrylic fabric with 68 ends × 30 picks.

|  | Control | Additive 1 | Additive 2 |
|---|---|---|---|
| ASTM D3776-96: Weight (ounces per square yard) | 7.7 | 7.6 | 7.7 |
| ASTM D5034-95: Break lbs. (machine direction) | 348 | 330 | 334 |
| ASTM D5034-95: Break lbs. (cross direction) | 165 | 164 | 172 |
| ASTM D2261-96: Tear lbs. (machine direction) | 20 | 18 | 19 |
| ASTM D2261-96: Tear lbs. (cross direction) | 15 | 16 | 15 |
| AATCC 22-2001: Spray water resistance | 100 | 100 | 100 |
| AATCC118-1997: Oil resistance | 5 | 5 | 5 |

Figure 15:
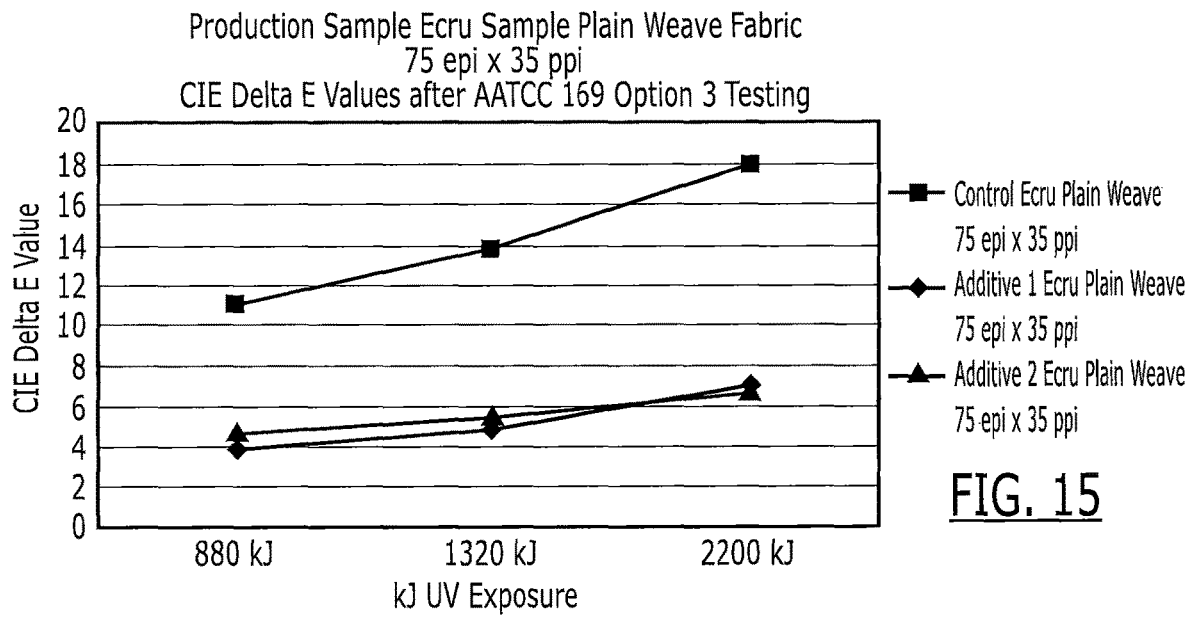
FIG. 15 is a graph showing the production scale ecru sample plain weave fabric 75 epi×35 ppi CIE Delta E values after AATCC 169 Option 3 testing.
Figure 16:
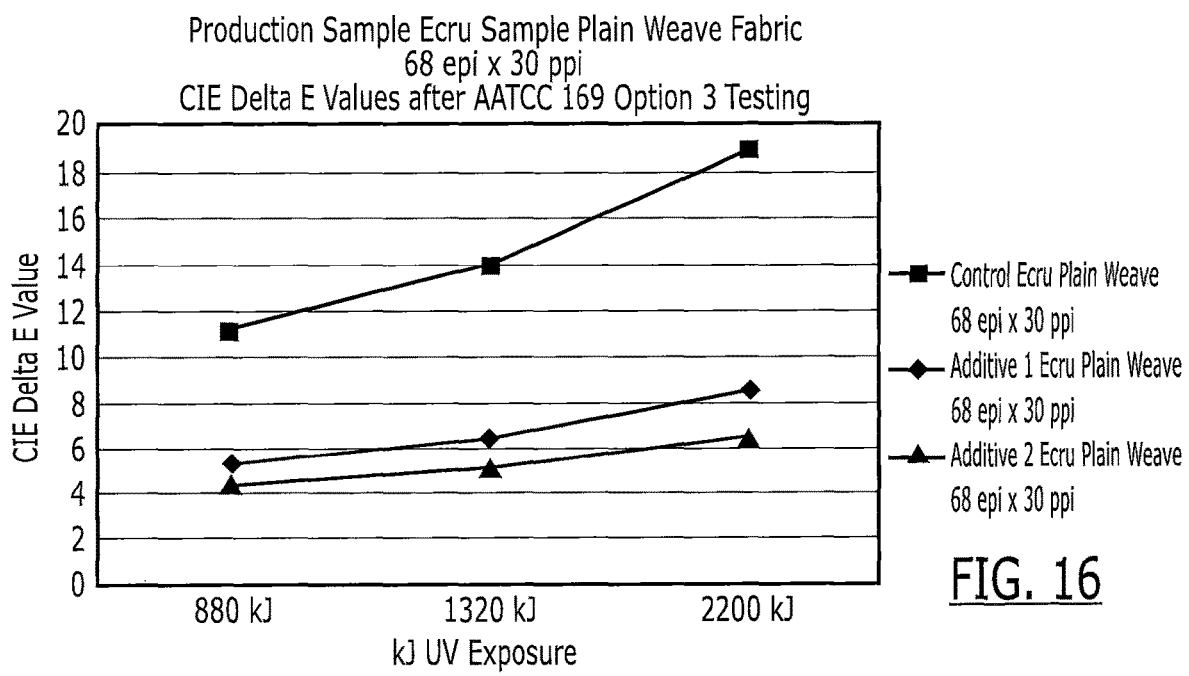
FIG. 16 is a graph showing the production scale ecru sample plain weave fabric 68 epi×30 ppi CIE Delta E values after AATCC 169 Option 3 testing.

In accordance with AATCC 169-3, evaluations for color change were completed after exposure of 75 ends×35 picks woven and finished fabric samples as described above (Table 15) and after exposure of 68 ends×30 picks woven and finished fabric samples as described above (Table 16). The spectrophotometric measurements were made using a Datacolor 650 with a Daylight source. FIG. 15 is a graph of the production scale ecru sample plain weave fabric 75 epi×35 ppi CIE Delta E values after AATCC 169 Option 3 testing, and FIG. 16 is a graph of the production scale ecru sample plain weave fabric 68 epi×30 ppi CIE Delta E values after AATCC 169 Option 3 testing.

TABLE 15

Production scale CIE Delta E values for ecru plain weave 75 epi × 35 ppi fabric samples after AATCC 169-3 testing.

| Sample | 880 kJ | 1320 Kj | 2200 kJ |
|---|---|---|---|
| Control Ecru Plain Weave 75 epi × 35 ppi | 11.12 | 13.75 | 18 |
| Additive 1 Ecru Plain Weave 75 epi × 35 ppi | 4.02 | 4.96 | 6.83 |
| Additive 2 Ecru Plain Weave 75 epi × 35 ppi | 4.86 | 5.46 | 6.88 |

TABLE 16

Production scale CIE Delta E values for ecru plain weave 68 epi × 30 ppi fabric samples after AATCC 169-3 testing.

| Sample | 880 kJ | 1320 Kj | 2200 kJ |
|---|---|---|---|
| Control Ecru Plain Weave 68 epi × 30 ppi | 10.13 | 12.55 | 17.03 |
| Additive 1 Ecru Plain Weave 68 epi × 30 ppi | 4.92 | 5.92 | 7.81 |
| Additive 2 Ecru Plain Weave 68 epi × 30 ppi | 4.19 | 4.77 | 5.96 |

Figure 17:
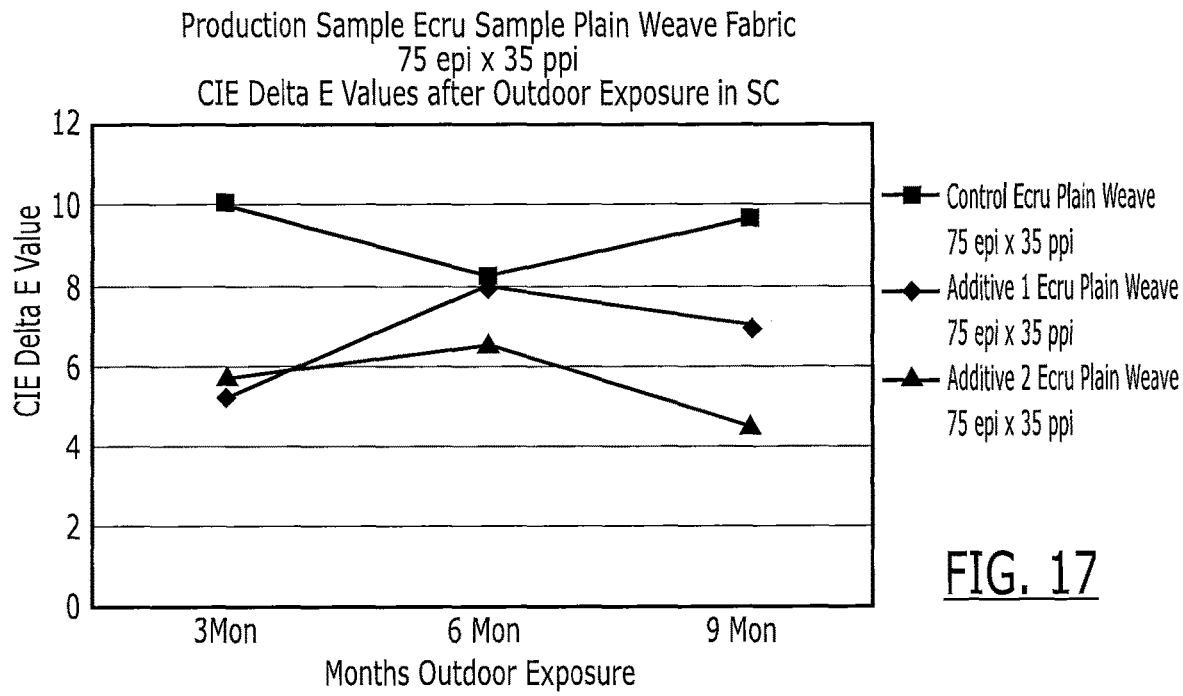
FIG. 17 is a graph showing the production scale ecru sample plain weave fabric 75 epi×35 ppi CIE Delta E values after outdoor exposure in South Carolina.
Figure 18:
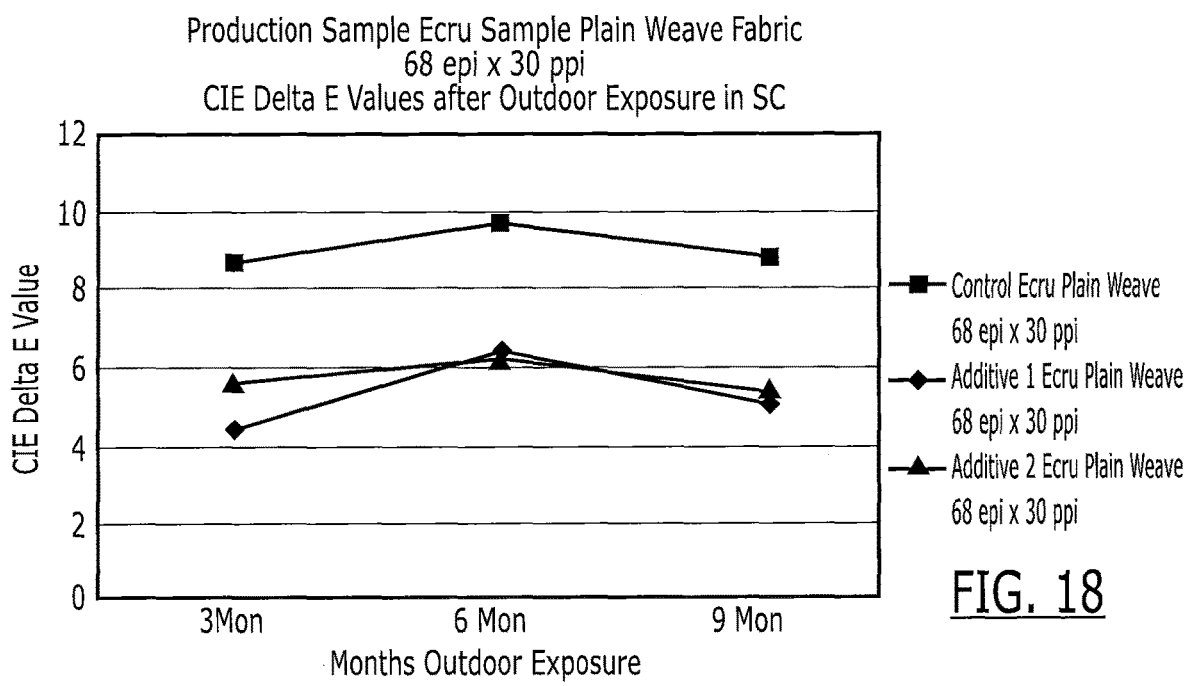
FIG. 18 is a graph showing the production scale ecru sample plain weave fabric 68 epi×30 ppi CIE Delta E values after outdoor exposure in South Carolina.

Evaluations for color change using real world weathering in South Carolina were completed after exposure of 75 ends×35 picks woven and finished fabric samples as described above (Table 17) and after exposure of 68 ends×30 picks woven and finished fabric samples as described above (Table 18). The spectrophotometric measurements were made using a Datacolor 650 with a Daylight source. Specimens were mounted at a 45-degree angle using an Atlas weathering rack facing due south in South Carolina. FIG. 17 is a graph of the production scale ecru sample plain weave fabric 75 epi×35 ppi CIE Delta E values after outdoor exposure in South Carolina, and FIG. 18 is a graph of the production scale ecru sample plain weave fabric 68 epi×30 ppi CIE Delta E values after outdoor exposure in South Carolina.

TABLE 17

Production scale CIE Delta E values for ecru plain weave 75 epi × 35 ppi fabric samples after outdoor exposure in South Carolina.

| Sample | 3 Mon | 6 Mon | 9 Mon |
|---|---|---|---|
| Control Ecru Plain Weave 75 epi × 35 ppi | 8.23 | 8.15 | 9.67 |
| Additive 1 Ecru Plain Weave 75 epi × 35 ppi | 4.58 | 6.87 | 6.92 |
| Additive 2 Ecru Plain Weave 75 epi × 35 ppi | 4.88 | 6.84 | 4.49 |

TABLE 18

Production scale CIE Delta E values for ecru plain weave 68 epi × 30 ppi fabric samples after outdoor exposure in South Carolina.

| Sample | 3 Mon | 6 Mon | 9 Mon |
|---|---|---|---|
| Control Ecru Plain Weave 68 epi × 30 ppi | 7.01 | 8.61 | 8.78 |
| Additive 1 Ecru Plain Weave 68 epi × 30 ppi | 3.59 | 4.95 | 5.09 |
| Additive 2 Ecru Plain Weave 68 epi × 30 ppi | 4.32 | 5.29 | 5.43 |

Figure 19:
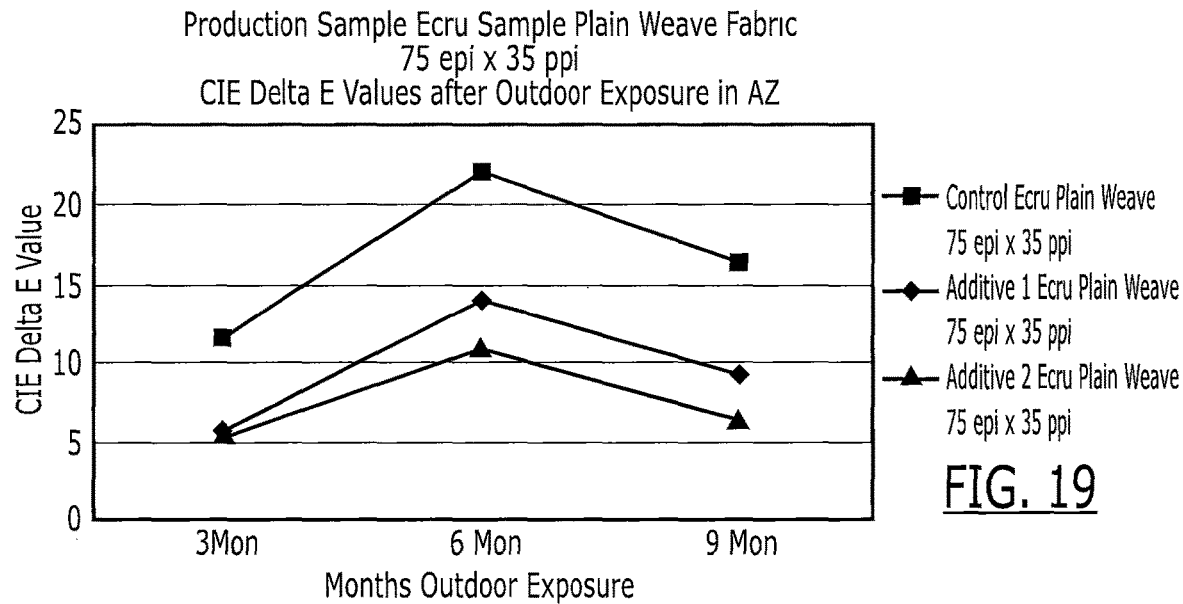
FIG. 19 is a graph showing the production scale ecru sample plain weave fabric 75 epi×35 ppi CIE Delta E values after outdoor exposure in Arizona.
Figure 20:
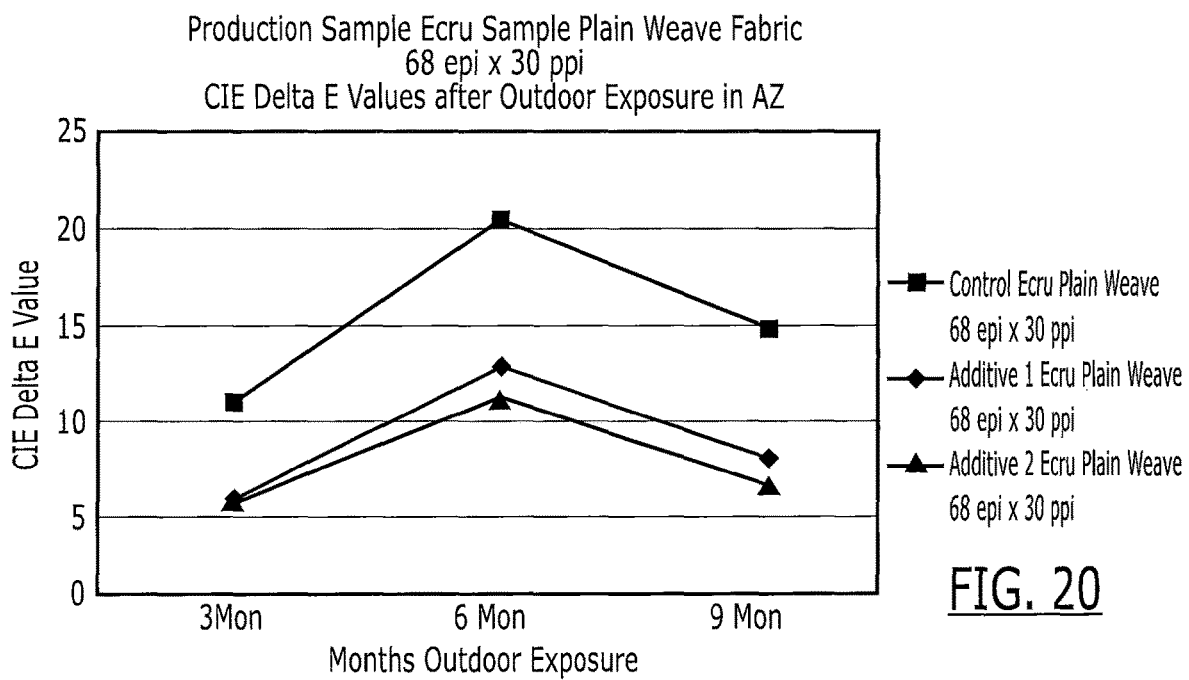
FIG. 20 is a graph showing the production scale ecru sample plain weave fabric 68 epi×30 ppi CIE Delta E values after outdoor exposure in Arizona.

Evaluations for color change using real world weathering in Arizona were completed after exposure of 75 ends×35 picks woven and finished fabric samples as described above (Table 19) and after exposure of 68 ends×30 picks woven and finished fabric samples as described above (Table 20). The spectrophotometric measurements were made using a Datacolor 650 with a Daylight source. Specimens were mounted at a 45-degree angle using an Atlas weathering rack facing due south in Arizona. FIG. 19 is a graph of the production scale ecru sample plain weave fabric 75 epi×35 ppi CIE Delta E values after outdoor exposure in Arizona, and FIG. 20 is a graph of the production scale ecru sample plain weave fabric 68 epi×30 ppi CIE Delta E values after outdoor exposure in Arizona.

TABLE 19

Production scale CIE Delta E values for ecru plain weave 75 epi × 35 ppi fabric samples after outdoor exposure in Arizona.

| Sample | 3 Mon | 6 Mon | 9 Mon |
|---|---|---|---|
| Control Ecru Plain Weave 75 epi × 35 ppi | 11.6 | 22.03 | 16.35 |
| Additive 1 Ecru Plain Weave 75 epi × 35 ppi | 5.52 | 13.99 | 9.18 |
| Additive 2 Ecru Plain Weave 75 epi × 35 ppi | 5.37 | 10.96 | 6.39 |

TABLE 20

Production scale CIE Delta E values for ecru plain weave 68 epi × 30 ppi fabric samples after outdoor exposure in Arizona.

| Sample | 3 Mon | 6 Mon | 9 Mon |
|---|---|---|---|
| Control Ecru Plain Weave 68 epi × 30 ppi | 11.12 | 20.24 | 14.87 |
| Additive 1 Ecru Plain Weave 68 epi × 30 ppi | 5.65 | 12.97 | 8.05 |
| Additive 2 Ecru Plain Weave 68 epi × 30 ppi | 5.85 | 11.31 | 6.66 |

Figure 21:
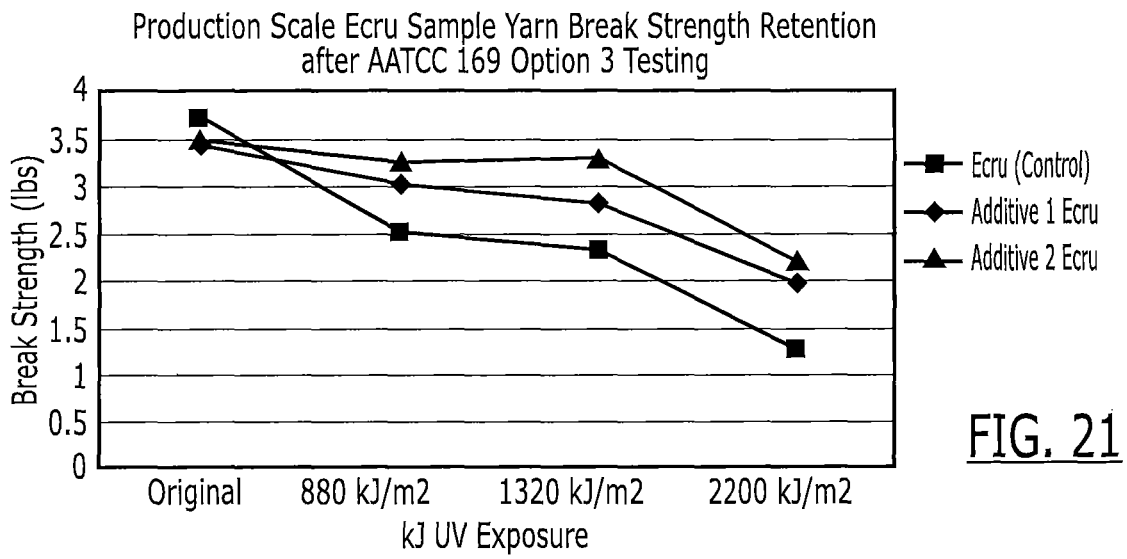
FIG. 21 is a graph of the production scale ecru sample yarn break strength retention after AATCC 169 Option 3 testing.
Figure 22:
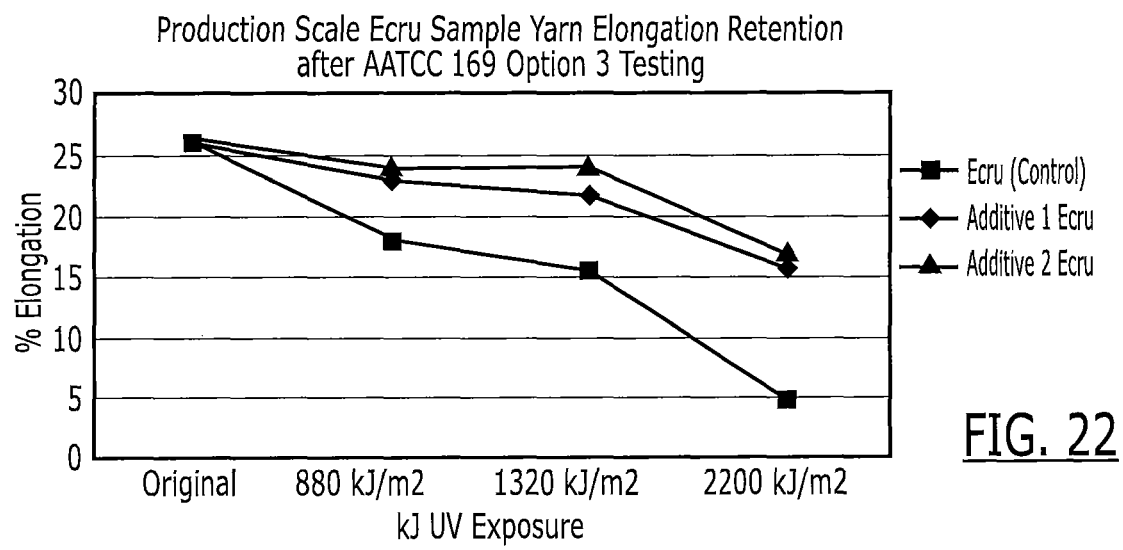
FIG. 22 is a graph of the production scale ecru sample yarn elongation retention after AATCC 169 Option 3 testing.

The break strength and elongation of the production scale 2.2 dtex × 48 mm acrylic staple fiber was also tested and the results are provided in Table 21. FIG. 21 is a graph of the production scale ecru sample yarn break strength retention after AATCC 169 Option 3 testing, and FIG. 22 is a graph of the production scale ecru sample yarn elongation retention after AATCC 169 Option 3 testing.

TABLE 21

Production scale yarn strength retention results.

| | Original | 880 kJ/m² | 1320 kJ/m² | 2200 kJ/m² |
|---|---|---|---|---|
| Ecru (Control) | | | | |
| Break Strength (lbs) | 3.715 | 2.523 | 2.327 | 1.293 |
| Elongation (%) | 26 | 17.89 | 15.35 | 4.814 |
| Additive 1 Ecru | | | | |
| Break Strength (lbs) | 3.443 | 3.038 | 2.828 | 1.991 |
| Elongation (%) | 26.17 | 22.76 | 21.66 | 15.75 |
| Additive 2 Ecru | | | | |
| Break Strength (lbs) | 3.507 | 3.257 | 3.297 | 2.224 |
| Elongation (%) | 26.13 | 24.13 | 24.05 | 16.95 |

Example 2

Heat stability was examined using specific HALS formulations of Tinuvin® 123 (i.e., Additive 2) or Tinuvin® 622 (i.e., Additive 1) in ecru acrylic fibers that were woven in a fabric having a plain weave with 75 epi×35 ppi or 68 epi×30 ppi as described in Example 1. The fabric samples were exposed to a temperature of 85° C. for 7 days in a forced air oven in accordance with LP-463LB-13-01, 5-4-2006, "Heat Aging of Trim Materials".

Delta E values were then measured for the heated samples and compared against non-heated samples of the same type. Tables 22 and 23 provide the CIE Delta E values for the fabrics. Additive 1 had a positive impact on heat stability during this testing and the heated fabric samples had less yellowing compared to the control samples.

TABLE 22

CIE Delta E values for Ecru Plain Weave 75 epi × 35 ppi Fabric Samples.

| Sample | CIE Delta E (Heated Compared to Initial) |
|---|---|
| Control Ecru Plain Weave 75 epi × 35 ppi | 1.05 |
| Additive 1 Ecru Plain Weave 75 epi × 35 ppi | 0.82 |
| Additive 2 Ecru Plain Weave 75 epi × 35 ppi | 2.27 |

TABLE 23

CIE Delta E values for Ecru Plain Weave 68 epi × 30 ppi Fabric Samples.

| Sample | CIE Delta E (Heated Compared to Initial) |
|---|---|
| Control Ecru Plain Weave 68 epi × 30 ppi | 1.09 |
| Additive 1 Ecru Plain Weave 68 epi × 30 ppi | 0.46 |
| Additive 2 Ecru Plain Weave 68 epi × 30 ppi | 1.75 |

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An acrylic fiber comprising:
an acrylonitrile polymer having acrylonitrile units present in an amount of at least 85% by weight of the acrylonitrile polymer; and
a hindered amine light stabilizer, wherein the hindered amine light stabilizer is within the acrylic fiber and is distributed throughout the polymer matrix of the acrylonitrile polymer, and
wherein the acrylonitrile polymer is the primary fiber-forming substance for the acrylic fiber and the acrylonitrile polymer is selected from the group consisting of poly(acrylonitrile-co-vinyl acetate) (P(AN-VA), poly(acrylonitrile-co-methyl acrylate) (P(AN-MA), poly(acrylonitrile-co-methyl methacrylate), and any combination thereof,
wherein the hindered amine light stabilizer has a water solubility at 20° C. of about 2% w/w or less, and
wherein the hindered amine light stabilizer is present in an amount in a range from about 1% to about 10% by weight of the acrylic fiber.

2. A method of preparing an acrylic fiber, the method comprising:
adding a hindered amine light stabilizer to an acrylonitrile polymer to provide a stabilized acrylic composition, wherein the acrylonitrile polymer has acrylonitrile units present in an amount of at least 85% by weight of the acrylonitrile polymer; and
forming an acrylic fiber from the stabilized acrylic composition, the acrylic fiber comprising the hindered amine light stabilizer and the acrylonitrile polymer, wherein the hindered amine light stabilizer is within the acrylic fiber and is distributed throughout the polymer matrix of the acrylonitrile polymer, and
wherein the acrylonitrile polymer is the primary fiber-forming substance for the acrylic fiber and the acrylonitrile polymer is selected from the group consisting of poly(acrylonitrile-co-vinyl acetate) (P(AN-VA), poly(acrylonitrile-co-methyl acrylate) (P(AN-MA), poly(acrylonitrile-co-methyl methacrylate), and any combination thereof, thereby preparing the acrylic fiber,
wherein the hindered amine light stabilizer has a water solubility at 20° C. of about 2% w/w or less, and
wherein the hindered amine light stabilizer is present in an amount in a range from about 1% to about 10% by weight of the acrylic fiber.

3. The method of claim 2, wherein adding the hindered amine light stabilizer to the acrylonitrile polymer comprises adding the hindered amine light stabilizer prior to and/or during a solubilization step and/or a fiber spinning step.

4. The method of claim 2, wherein adding the hindered amine light stabilizer to the acrylonitrile polymer comprises adding the hindered amine light stabilizer to a dope and/or solvent.

5. The method of claim 2, wherein adding the hindered amine light stabilizer to the acrylonitrile polymer comprises providing the hindered amine light stabilizer in an amount in a range of about 1% to about 10% by weight of the stabilized acrylic composition.

6. The method of claim 2, wherein the hindered amine light stabilizer is compatible with and/or dissolved in a solvent present in the stabilized acrylic composition.

7. The method of claim 6, wherein the solvent is a polar solvent or sodium thiocyanate.

8. The method of claim 2, wherein the acrylic fiber comprises the hindered amine light stabilizer in an amount in a range from about 1% to about 3% by weight of the acrylic fiber.

9. The method of claim 2, further comprising adding a pigment and/or additive to the acrylonitrile polymer.

10. The method of claim 9, wherein adding the pigment and/or additive to the acrylonitrile polymer is performed prior to, during and/or after the step of adding the hindered amine light stabilizer to the acrylonitrile polymer.

11. An article comprising an acrylic fiber prepared according to the method of claim 2.

12. The method of claim 10, wherein adding the hindered amine light stabilizer to the acrylonitrile polymer and adding the pigment and/or additive to the acrylonitrile polymer are performed simultaneously.

13. The method of claim 2, wherein the acrylonitrile polymer is poly(acrylonitrile-co-vinyl acetate) (P(AN-VA).

14. The method of claim 2, wherein the acrylonitrile polymer has a molecular weight in a range from about 40,000 g/mol to about 200,000 g/mol.

15. The method of claim 2, wherein the acrylic fiber is in the form of a yarn and the yarn is in the form of a fabric, and wherein the fabric has a CIE Delta E of less than about 8 after exposure to 2200 kJ in accordance with AATCC 169 Option 3.

16. The method of claim 2, wherein the acrylic fiber is a solution-dyed acrylic fiber.

17. The acrylic fiber of claim 1, wherein the hindered amine light stabilizer is present in an amount of about 1% to about 3% by weight of the acrylic fiber.

18. The acrylic fiber of claim 1, wherein the acrylonitrile polymer is poly(acrylonitrile-co-methyl acrylate) (P(AN-MA)).

19. The acrylic fiber of claim 1, wherein the acrylic fiber is a solution-dyed acrylic fiber.

20. The method of claim 2, wherein the acrylonitrile polymer is poly(acrylonitrile-co-methyl acrylate) (P(AN-MA)).

* * * * *

UNITED STATES PATENT AND TRADEMARK OFFICE
CERTIFICATE OF CORRECTION

PATENT NO. : 11,767,616 B2
APPLICATION NO. : 16/638832
DATED : September 26, 2023
INVENTOR(S) : Buffington et al.

It is certified that error appears in the above-identified patent and that said Letters Patent is hereby corrected as shown below:

In the Specification

Column 4, Line 9: Please correct "+1%, +05%" to read --±1%, ±05%--

Column 12, Line 11: Please correct "1 to 16" to read --1 to 10--

Column 16, Line 56: Please correct "27+3%" to read --27 ±3%--

Column 19, Line 13: Please correct "+70%" to read --±70%--

Column 20, Line 12: Please correct "+0" to read --±0--

Column 20, Line 16: Please correct "+0" to read --±0--

Column 23, Line 6: Please correct "Tensoj et." to read --Tensojet.--

Signed and Sealed this
Twenty-sixth Day of March, 2024

Katherine Kelly Vidal
*Director of the United States Patent and Trademark Office*